(12) United States Patent
Sakamoto et al.

(10) Patent No.: US 6,934,479 B2
(45) Date of Patent: Aug. 23, 2005

(54) WAVELENGTH DIVISION MULTIPLEXING OPTICAL COMMUNICATION SYSTEM AND WAVELENGTH DIVISION MULTIPLEXING OPTICAL COMMUNICATION METHOD

(75) Inventors: Takeshi Sakamoto, Kawasaki (JP); Futoshi Izumi, Kawasaki (JP); Toshikazu Ueki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 582 days.

(21) Appl. No.: 09/776,630

(22) Filed: Feb. 6, 2001

(65) Prior Publication Data

US 2002/0048062 A1 Apr. 25, 2002

(30) Foreign Application Priority Data

Aug. 8, 2000 (JP) ........................................ 2000-240136

(51) Int. Cl.⁷ ........................... H04B 10/04; H04B 10/12
(52) U.S. Cl. ...................... 398/193; 398/194; 398/195; 398/199
(58) Field of Search ............................... 398/193–195, 398/199, 26, 27, 147, 159, 162

(56) References Cited

U.S. PATENT DOCUMENTS

| | | | | |
|---|---|---|---|---|
| 5,790,289 A | * | 8/1998 | Taga et al. ..................... 398/79 |
| 5,847,862 A | | 12/1998 | Chraplyvy et al. | |
| 6,016,379 A | * | 1/2000 | Bulow ........................ 385/147 |
| 6,040,933 A | * | 3/2000 | Khaleghi et al. ............... 398/1 |
| 6,134,034 A | * | 10/2000 | Terahara ........................ 398/1 |
| 6,236,487 B1 | * | 5/2001 | Stephens .................... 398/160 |
| 6,370,300 B1 | * | 4/2002 | Eggleton et al. ............. 385/37 |
| 6,392,769 B1 | * | 5/2002 | Ford et al. ...................... 398/9 |
| 6,433,904 B1 | * | 8/2002 | Swanson et al. .............. 398/91 |
| 6,583,910 B1 | * | 6/2003 | Satoh .......................... 398/182 |

FOREIGN PATENT DOCUMENTS

| | | | |
|---|---|---|---|
| JP | 09-230399 | 9/1997 | |
| JP | 9-261205 | * 10/1997 | ............ H04J/14/00 |

OTHER PUBLICATIONS ("Optimization Theory with Applications" by D. Pierre, Wiley 1969 with republication by Dover in 1986, pp. 414–417.*

* cited by examiner

Primary Examiner—M. R. Sedighian
Assistant Examiner—Shi K. Li
(74) Attorney, Agent, or Firm—Staas & Halsey LLP

(57) ABSTRACT

The object of the present invention is to provide a WDM optical communication system and a WDM communication method wherein deviation of transmission characteristics of optical signals of respective wavelengths is reliably controlled, based on reception information such as the OSNR, BER and the like measured at the receiving end, thereby enabling optimal transmission conditions to be realized. For this purpose, the present WDM optical communication system transmits WDM signal light of wavelengths $\lambda 1 \sim \lambda n$, which has been generated by the transmitting end of one terminal station, to the receiving end of the other terminal station through an optical transmission path. At the receiving end, the OSNR and BER of the optical signals of wavelengths $\lambda 1 \sim \lambda n$ are measured, and the result is superimposed on overhead information transmitted along the opposing line of the optical transmission path as reception information. At the transmitting end, the settings of pre-emphasis and a parameter α are feedback controlled based on the reception information about each wavelength transmitted, and deviation of transmission characteristics of respective wavelengths is thus suppressed.

24 Claims, 15 Drawing Sheets

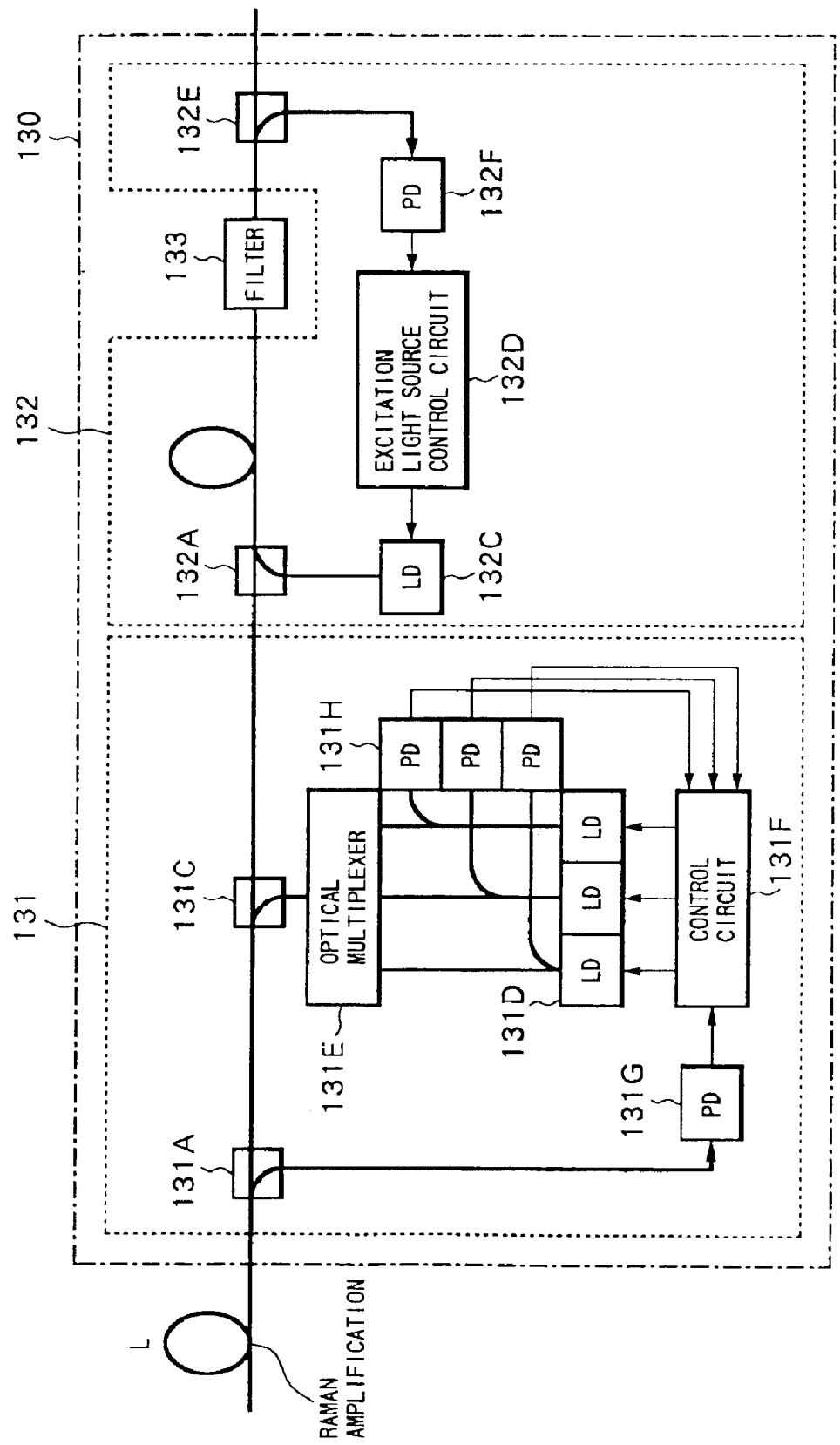

WAVELENGTH DIVISION MULTIPLEXING OPTICAL COMMUNICATION SYSTEM AND WAVELENGTH DIVISION MULTIPLEXING OPTICAL COMMUNICATION METHOD

BACKGROUND OF THE INVENTION

1. Field of the Invention

The present invention relates to a wavelength division multiplexing (WDM:Wavelength Division Multiplexing) optical communication technique. In particular, the present invention relates to a WDM optical communication system and a WDM optical communication method, wherein pre-emphasis is performed on optical signals of respective wavelengths depending on reception information measured at the receiving end.

2. Description of Related Art

In recent years, research and development of WDM optical communication systems have been carried on actively with an aim toward a large transmission capacity of communication lines. With conventional WDM optical communication systems, it is known that deviation of transmission characteristics occurs in optical signals of respective wavelengths. The transmission characteristics of a WDM optical communication system can be measured, for example, by the SN ratio of the optical signal (OSNR). However, due to the abovementioned deviation of transmission characteristics, the OSNR of an optical signal of a specific wavelength is worse in a wavelength division multiplexed optical signal, so that, in spite of there being an optical signal of a wavelength with a good OSNR, the transmission characteristics are estimated by the worst OSNR. Consequently, in a WDM optical communication system, it is required that the OSNR of optical signals of any wavelength should show similarly good value.

The main causes of deviation of transmission characteristics as mentioned above are known. For example, due to wavelength dependences such as the gain of optical amplifiers installed in repeaters and losses in optical fiber transmission paths, or due to transmission and reception level deviations between respective wavelength caused by the Raman effect of an optical fiber and the like, the OSNR of an optical signal of a specific wavelength is degraded at the receiving end.

To counteract the abovementioned OSNR degradation, the application of a pre-emphasis technique is effective, for example. With a pre-emphasis technique, photoelectric power of each channel (an optical signal of each wavelength) on the transmitting end is set to a different value. To be specific, pre-emphasis is performed on a channel whose OSNR at the receiving end is low in the case where pre-emphasis is not performed, in order to set higher photoelectric power at the transmitting end than that of the other channels. Furthermore, pre-emphasis is performed on a channel whose OSNR at the receiving end is high in the case where pre-emphasis is not performed, in order to set lower photoelectric power at the transmitting end than that of the other channels. In this manner, the deviation of the OSNR between channels can be suppressed.

Furthermore, another main cause of deviation of transmission characteristics is known in that, for example, in a WDM optical communication system including optical add drop nodes, variation of the OSNR occurs at the receiving end due to a difference in the number of optical amplifiers that each channel passes through. That is to say, a channel with many transmission spans has a degraded OSNR at the receiving end, while a channel with a small number has a margin in the OSNR at the receiving end.

For the variation of the abovementioned OSNR, a method has been developed, for example, wherein at each optical add drop node, the input light level of each wavelength, noise figure data of the optical amplifier, and the like are collected, and an optimal pre-emphasis amount is set for each optical path through which an optical signal of each wavelength passes.

However, in a conventional WDM optical communication system wherein pre-emphasis is performed as mentioned above, there is a problem in that, if the pre-emphasis amount to be applied to the WDM signal light increases, the influence of nonlinear optical effects increases, so that the transmission characteristics are degraded. Such degradation due to the influence of nonlinear optical effects is difficult to determine accurately by monitoring only the OSNR conditions at the receiving end. Therefore, there is a case where optimal transmission characteristics cannot be obtained, even though pre-emphasis is controlled depending on the OSNR monitored at the receiving end in a conventional manner.

Furthermore, there is another problem in conventional WDM optical communication systems in that, if the range of waveband of WDM signal light is expanded, deviation of the transmission characteristics is difficult to limit sufficiently by only the pre-emphasis control performed at the transmitting end. For example, techniques aimed at expanding the optical signal waveband range by applying such as a Raman amplifier to an optical repeater station and the like have been developed. However, there has been a case in that, if pre-emphasis of an optical signal with such a broad waveband is to be controlled only at the transmitting end, a required amount of pre-emphasis control becomes difficult to be performed owing to the control range constraints of variable optical attenuators and the like that control the power of transmitted light. To deal with such situations, it is considered to be effective to use a combination of other control techniques that control the deviation of transmission characteristics with pre-emphasis.

SUMMARY OF THE INVENTION

The present invention takes note of the points mentioned above, with the object of providing a WDM optical communication system and a WDM optical communication method wherein, based on reception information measured at a receiving end, deviation of transmission characteristics of optical signals of respective wavelengths is suppressed reliably while taking an influence of nonlinear optical effects into consideration, so that optimal transmission conditions can be realized.

To achieve the abovementioned object, with one aspect of a wavelength division multiplexing communication system according to the present invention, there is provided a WDM optical communication system for transmitting wavelength division multiplexed signal light containing a plurality of optical signals of different wavelengths, from a transmitting terminal station to a receiving terminal station via an optical transmission path, wherein the receiving terminal station comprises reception characteristics measurement means for measuring reception information including optical signal to noise ratio and a transmission error rate for the optical signals of respective wavelengths transmitted through the optical transmission path, and reception information transmission means for transmitting the reception information about each wavelength measured by the reception characteristics measurement means to the transmitting terminal station, and the transmitting terminal station comprises pre-emphasis performing means for performing pre-emphasis on the wavelength division multiplexed signal light transmitted along the optical transmission path, chirp applying means for applying an optical wavelength chirp to the wavelength division multiplexed signal light transmitted along the optical transmission path, and control means for controlling, depending on the reception information about each wavelength transmitted from the receiving terminal station, the setting of pre-emphasis in the pre-emphasis performing device, and the setting of a parameter a representing an amount of the optical wavelength chirp in the chirp applying means.

With such a construction, pre-emphasis is performed by the pre-emphasis performing means, and WDM signal light that has been applied with an optical wavelength chirp by the chirp applying means is transmitted through the optical transmission path from the transmitting terminal station to the receiving terminal station. At the receiving terminal station, the WDM signal light transmitted is received and processed, and also the reception information about each wavelength is measured by the reception characteristics measurement means. The reception information about each wavelength is information containing an optical signal to noise ratio (OSNR) and a transmission error rate represented by a bit error rate or a value Q, which is transmitted back to the transmitting terminal station end by the reception information transmission means. At the transmitting terminal station, depending on the reception information about each wavelength from the receiving end, the setting of pre-emphasis and the setting of the parameter a representing the intensity of the optical wavelength chirp are feedback controlled by the control means. As a result, optimal transmission conditions can be obtained, and hence it is possible to compensate reliably for deviation of transmission characteristics of the optical signals of respective wavelengths including degradation by an influence of nonlinear optical effects.

Furthermore, in the abovementioned wavelength division multiplexing optical communication system, the construction may be such that the reception characteristics measurement means measures an electrical signal to noise ratio pertaining to the optical signals of respective wavelength transmitted along the optical transmission path, and converts the measured electrical signal to noise ratio to the optical signal to noise ratio or transmission error rate according to a previously set relationship between the electrical signal to noise ratio and the optical signal to noise ratio or the transmission error rate, to thereby obtain reception information about each wavelength.

By using a reception characteristics measurement means with such a construction, it is possible to measure the reception information about each wavelength with a simply constructed electric circuit without using a light spectrum analyzer.

With another aspect of the wavelength division multiplexing optical communication system according to the present invention, there is provided a wavelength division multiplexing communication system according to the present invention, there is provided a WDM optical communication system for transmitting wavelength division multiplexed signal light containing a plurality of optical signals of different wavelengths, from a transmitting terminal station to a receiving terminal station via an optical transmission path and an optical repeater station, wherein the receiving terminal station comprises reception characteristics measurement means for measuring reception information including an optical signal to noise ratio and a transmission error rate for the optical signals of respective wavelengths transmitted through the optical transmission path, and reception information transmission means for transmitting the reception information about each wavelength measured by the reception characteristics measurement means to the transmitting terminal station, and the transmitting terminal station comprises pre-emphasis performing means for performing pre-emphasis on the wavelength division multiplexed signal light transmitted along the optical transmission path, control means for controlling, depending on the reception information about each wavelength transmitted from the receiving terminal station, the setting of pre-emphasis in the pre-emphasis performing device, and reception information transfer means for transferring the reception information about each wavelength transmitted from the receiving terminal station to the optical repeater station, and the optical repeater station comprises optical amplification means containing a Raman amplifier for Raman amplifying the wavelength division multiplexed signal light transmitted from the optical transmission path, and Raman amplification control means for controlling a supply condition of Raman excitation light in the Raman amplifier corresponding to the reception information about each wavelength transmitted from the transmitting terminal station.

With such a construction, WDM signal light on which pre-emphasis is performed by the pre-emphasis performing means is transmitted from the transmitting terminal station along the optical transmission path, and repeatedly transmitted to the receiving terminal station, while being amplified by the optical amplification means in the optical repeater station arranged along the optical transmission path. At the receiving terminal station, the transmitted WDM signal light is received and processed, and also the reception information containing OSNR and transmission error rate of the optical signals of respective wavelength is measured by the reception characteristics measurement means, to be transmitted to the transmitting terminal station end by the reception information transmission means. At the transmitting terminal station, depending on the reception information about each wavelength from the receiving end, the setting of pre-emphasis is feedback controlled by the control means, and also the reception information about each wavelength is transferred to the optical repeater station by the reception information transfer means. At the optical repeater station, a supply condition of Raman excitation light is feedback controlled by the Raman amplification control means. In this manner, optimal transmission conditions are realized, thus enabling reliable compensation of the deviation of transmission characteristics.

Furthermore, the construction of the WDM optical communication system according to the present invention may be a combination of the abovementioned two aspects. In a WDM optical communication system with such a construction, depending on the reception information about each wavelength measured at the receiving terminal station, each of the pre-emphasis and α parameter settings at the transmitting terminal station, and the condition of the Raman amplification at the optical repeater station, are feedback controlled.

Other objects, features and advantages of this invention will become apparent in the following description of the embodiments with reference to the attached drawings.

BRIEF DESCRIPTION OF THE DRAWINGS

FIG. 16 shows another structural example of the optical repeater applicable to the third embodiment of the present invention.

DETAILED DESCRIPTION OF THE INVENTION

As follows is a description of embodiments of the present invention based on the drawings.

Figure 1:
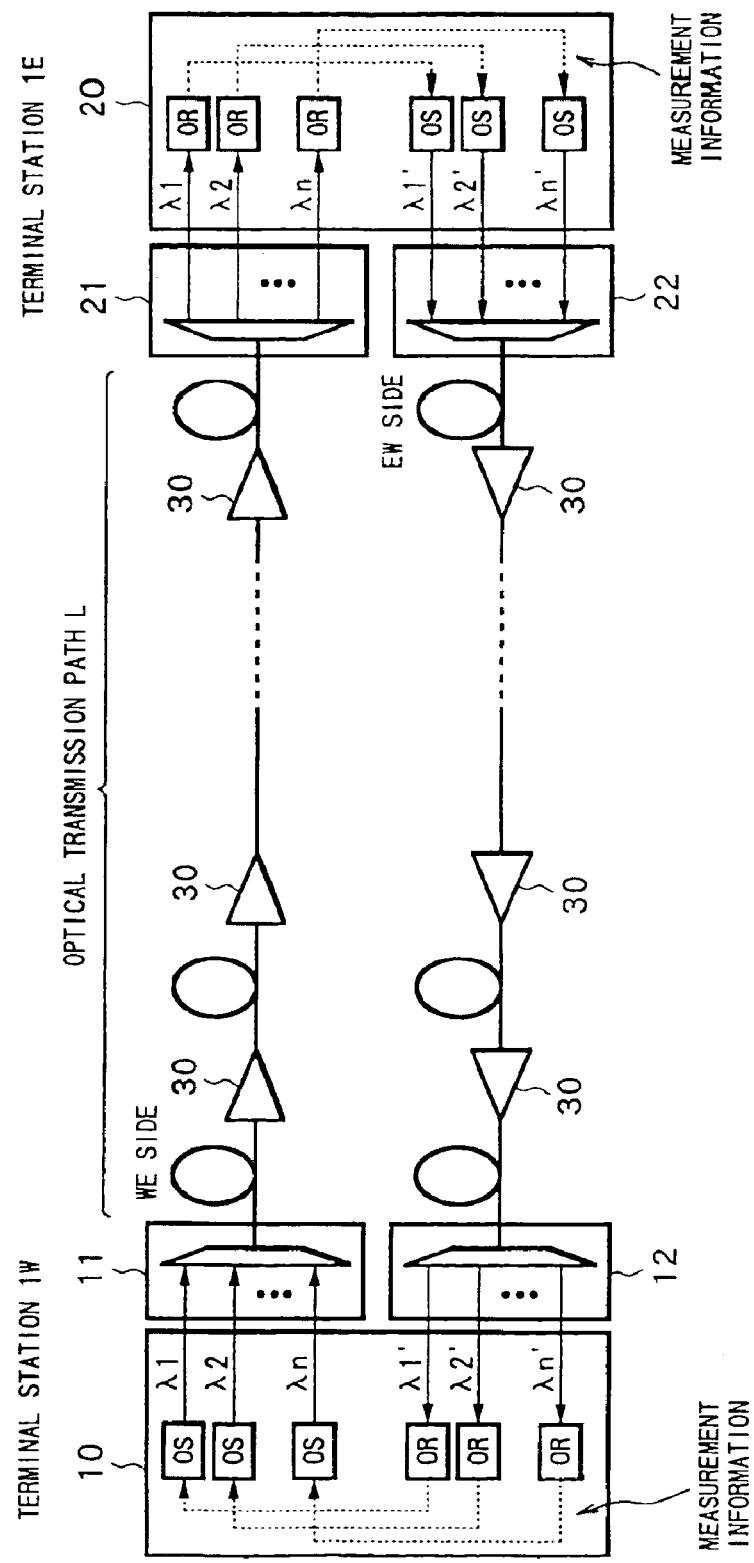
FIG. 1 shows the structure of a WDM optical communication system according to a first embodiment of the present invention.

FIG. 1 shows a structure of a WDM optical communication system according to a first embodiment.

In FIG. 1, the construction of the present WDM optical communication system is, for example, that two transmitting-receiving terminal stations, 1W and 1E, are connected by an optical transmission path L comprising two lines of opposing transmission directions. Here, the line that transmits WDM signal light from the terminal station 1W to the terminal station 1E is designated the WE line, and the line that transmits from the terminal station 1E to the terminal station 1W is designated the EW line. In both the WE line and the EW line, a plurality of optical amplifiers (optical repeaters) 30 are arranged at required repeater spacing. A system constructed like this is suitable for a land WDM optical communication system.

The terminal station 1W, for example, has a transmitter-receiver 10 and WDM apparatuses 11 and 12. The transmitter-receiver 10 transmits respective optical signals of wavelengths $\lambda 1, \lambda 2, \ldots, \lambda n$ generated in n optical transmitters (OS), respectively, to the WDM apparatus 11, and also receives, via n optical receivers (OR), respective optical signals of wavelengths $\lambda 1', \lambda 2', \ldots,$ and $\lambda n'$ transmitted from the WDM apparatus 12. This transmitter-receiver unit 10 is provided with a path for transmitting reception information as described later from the optical receiver corresponding to the wavelength $\lambda 1'$ to the optical receiver corresponding to the wavelength $\lambda 1$ and, similarly, provided with a path for transmitting reception information from each of the optical receivers corresponding to the wavelengths $\lambda 2', \ldots,$ and $\lambda n'$, respectively to each of the optical transmitters corresponding to wavelengths $\lambda 2, \ldots,$ and $\lambda n$, respectively.

The WDM apparatus 11 multiplexes the optical signals of the respective wavelengths $\lambda 1\sim\lambda n$ output from the respective optical transmitters, to transmit to the line on the WE side of the optical transmission path L. The WDM apparatus 12 demultiplexes the WDM signal light transmitted from the line on the EW side of the optical transmission path L into wavelengths $\lambda 1'\sim\lambda n'$, to transmit to the corresponding optical receivers.

The terminal station 1E is, similarly to the abovementioned terminal station 1W, provided with a transmitter-receiver 20 and WDM apparatuses 21 and 22. The transmitter-receiver 20 receives, via n optical receivers (OR), respective optical signals of wavelengths $\lambda 1\sim\lambda n$ transmitted from the WDM apparatus 21 and transmits respective optical signals of wavelengths $\lambda 1'\sim\lambda N'$ generated in n optical transmitters (OS), respectively, to the WDM apparatus 22 via n optical transmitters (OS). This transmitter-receiver 20 is provided with a path for transmitting the reception information to the optical transmitter corresponding to each of the wavelengths $\lambda 1'\sim\lambda n'$ from the receiver corresponding to each of the wavelengths $\lambda 1\sim\lambda n$.

The WDM apparatus 21 demultiplexes into wavelengths $\lambda 1'\sim\lambda n'$ the WDM signal light transmitted from the line on the WE side of the optical transmission path L, to transmit to the corresponding optical receivers. The WDM apparatus 22 multiplexes the optical signals of respective wavelengths $\lambda 1'\sim\lambda n'$ output from the respective optical transmitters, to transmit to the line on the EW side of the optical transmission path L.

A specific construction of each of the transmitter-receivers 10 and 20 will now be described.

Figure 2:
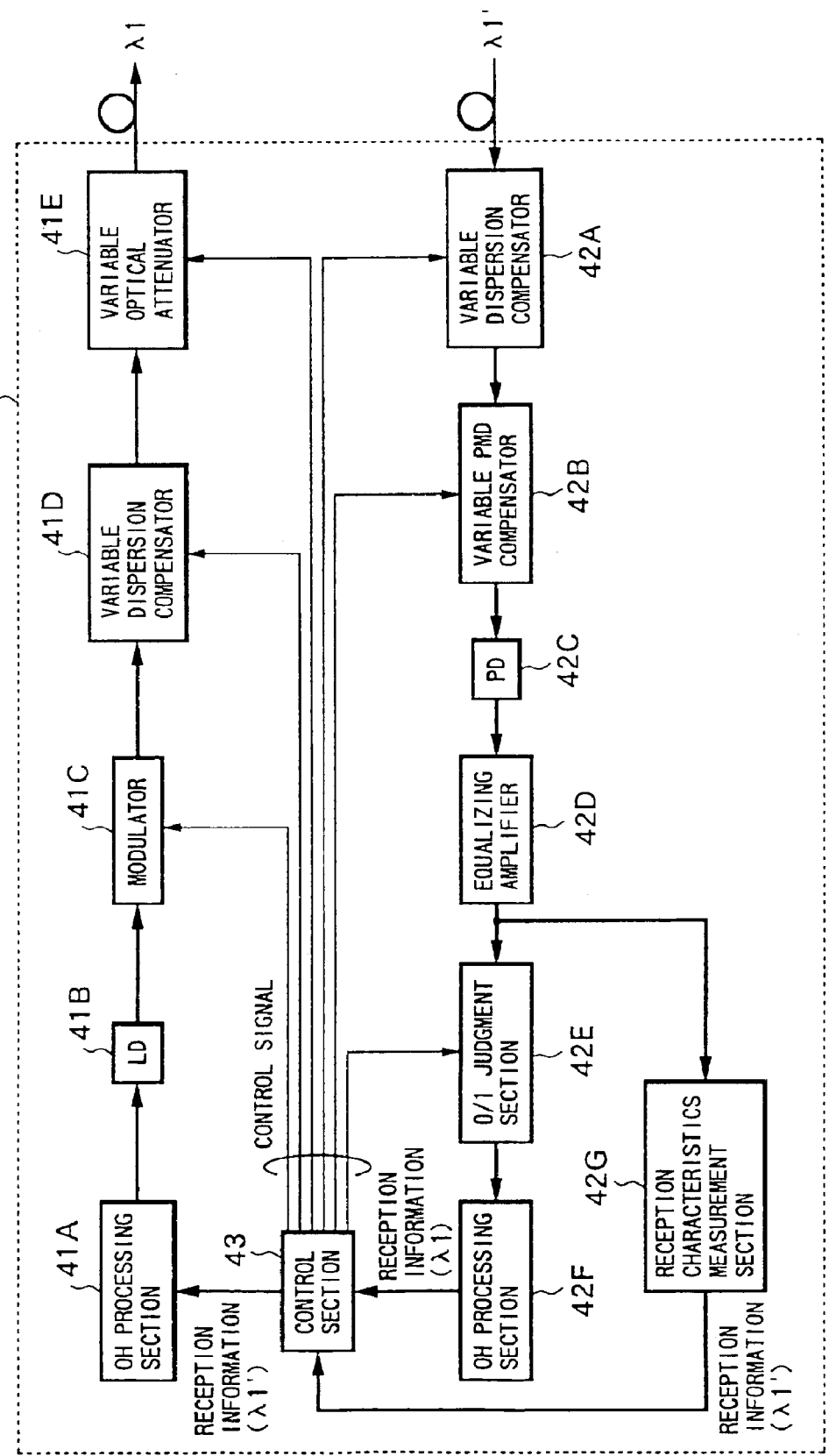
FIG. 2 is a block diagram showing a structural example of an optical transmitter and optical receiver of a transmitter-receiver unit in the first embodiment of the present invention.

FIG. 2 is a block diagram showing a structural example of an optical transmitter and an optical receiver corresponding to the wavelength $\lambda 1$ and the wavelength $\lambda 1'$ in the transmitter-receiver 10, for example. Here, a structural example corresponding only to the wavelengths $\lambda 1$ and $\lambda 1'$ is described. However, the construction of the optical transmitters and optical receivers corresponding to the other wavelengths $\lambda 2\sim\lambda n$, $\lambda 2'\sim\lambda n'$, and the construction of the optical transmitters and optical receivers corresponding to the respective wavelengths $\lambda 1'\sim\lambda n'$, $\lambda 1\sim\lambda n$ of the transmitter-receiver 20 are similar.

In the structural example in FIG. 2, the optical transmitter that transmits the optical signal of wavelength $\lambda 1$, and the optical receiver that receives the optical signal of wavelength $\lambda 1'$ are mounted in a unit 40. This unit 40 is provided with: an OH processing section 41A; a laser light source (LD) 41B; a modulator 41C; a variable dispersion compensator 41D; and a variable optical attenuator 41E, as a construction corresponding to an optical transmitter, and is provided with: a variable dispersion compensator 42A; a variable PMD compensator 42B; a photodetector (PD) 42C; an equalizing amplifier 42D; a 0/1 judgment section 42E; an OH processing section 42F; and a reception characteristics measurement section 42G, as a construction corresponding to an optical receiver, and is further provided with a control section 43 for controlling the operating conditions of the transmitting end and receiving end.

The OH processing section 41A, to which reception information about wavelength λ1 measured by the reception characteristics measurement section 42G is transmitted via the control section 43, superimposes the reception information about the wavelength λ1 onto overhead (OH) information of the optical signal of wavelength λ1.

The laser source 41B is a standard light source generating a light of wavelength λ1, and the output light from this laser source 41B is externally modulated by the modulator 41C. Furthermore in the modulator 41C, a required amount of light wavelength chirp is added to the optical signal to compensate for waveform distortion by self phase modulation. The amount of the light wavelength chirp added to this optical signal is typically represented by a parameter α, which can be changed according to the operating condition of the modulator. Here, the setting of the parameter α is adjustable depending on a control signal transmitted from the control section 43 to the modulator 41C. Accordingly, the modulator 41C functions here as a chirp applying means.

The variable dispersion compensator 41D is a standard optical device for compensating for wavelength dispersion generated on the line on the WE side of the optical transmission path L for the optical signal of wavelength λ1, and the compensation amount is variably controlled depending on a control signal from the control section 43.

The variable optical attenuator 41E adjusts the power of the optical signal of wavelength λ1 output from the present unit 40, and the degree of light attenuation is variably controlled depending on a control signal from the control section 43. By adjusting the degree of light attenuation of this variable optical attenuator 41E, pre-emphasis is performed on the optical signal. Accordingly here, the variable optical attenuator 41E functions as a pre-emphasis performing means.

The variable dispersion compensator 42A is a standard optical device for compensating for wavelength dispersion generated on the line on the EW side of the optical transmission path L for the optical signal of wavelength λ1', and the compensation amount is variably controlled depending on a control signal from the control section 43.

The variable PMD compensator 42B is an optical device for compensating for polarization-mode dispersion (PMD) generated on the line on the EW side of the optical transmission path L for the optical signal of wavelength λ1', and the amount of compensation is variably controlled depending on a control signal from the control section 43. Here, PMD is dispersion occurring due to a difference in the propagation delay time of polarization elements (for example two mode lights such as TE mode and TM mode) of the optical signal. For example, in the case of super high-speed optical transmission where the transmission speed reaches 40 Gb/s, compensation for PMD is required. Accordingly, in the case where the optical signal is transmitted at a lower speed than the transmission speed mentioned above, the variable PMD compensator 42B can be omitted.

The photodetector 42C is a well-known optical receiver that converts the optical signal of wavelength λ1' after passed through the variable PMD compensator 42B into an electrical signal. The equalizing amplifier 42D comprises a standard electric circuit which amplifies an output signal from the photodetector 42C up to a required level.

The 0/1 judgment section 42E is a standard discrimination decision circuit which performs 0/1 judgment of a received signal that has been equalization amplified by the equalizing amplifier 42D, whose discrimination decision point can be adjusted depending on a control signal from the control section 43.

The OH processing section 42F identifies the reception information about the wavelength λ1 that was superimposed on the received overhead information of the optical signal of the wavelength λ1', to transmit to the control section 43.

The reception characteristics measurement section 42G, for example, based on the received signal equalization amplified by the equalizing amplifier 42D, measures and computes the signal to noise ratio (OSNR) and bit error rate (BER) of the optical signal of wavelength λ1', and then transmits the result to the control section 43 as reception information about the wavelength λ1'.

The control section 43, based on the reception information about the wavelength λ1 from the OH processing section 42F, generates control signals for controlling the respective operating conditions of the modulator 41C, the variable dispersion compensator 41D, and the variable optical attenuator 41E, and also based on the reception information about the wavelength λ1' from the reception characteristics measurement section 42G, generates control signals for controlling the respective operating conditions of the variable dispersion compensator 42A, the variable PMD compensator 42B, and the 0/1 judgment section 42E. Furthermore, this control section 43 also has a function for transferring the reception information about the wavelength λ1' to the OH processing section 41 A, and the reception information about the wavelength λ1' is superimposed on the OH information of the optical signal of the wavelength λ1 by the OH processing section 41A.

A specific construction of the reception characteristics measurement section 42G will now be described.

In the reception characteristics measurement section 42G, the OSNR and BER are measured as reception characteristics parameters to be used for operation control of each section. For the measurement of OSNR, in the case where conventional techniques are used, a very high quality optical spectrum analyzer is required. That is to say, for example, when control automation is considered, an optical spectrum analyzer with a wide dynamic range from a peak level of the optical signal to the noise light level, and a high resolution is required. However, there is a disadvantage in that such a high quality optical spectrum analyzer is expensive and physically large. Furthermore, there is also a problem in that measurements cannot fully handle the super high-densification of wavelengths and increases in bit rate that have been developing rapidly in recent years, even though the commercial optical spectrum is used. Furthermore, in a system that contains an optical add and drop multiplexer, when a signal light is removed in order to avoid crosstalk between transiting light and inserted light, noise light is also removed in a narrow band. Therefore, measurement of the noise light level in the proximity of an optical signal at a receiving terminal station requires extremely high accuracy and resolution, and hence the measurement is not possible with current optical spectrum analyzers.

In a situation as mentioned above, in the case of conventional methods, it is necessary to obtain the OSNR by calculation. However, in this case there is also a possibility of an error occurring in the calculated OSNR, due to input level measurement errors owing to insertion point limitations and the like of an optical spectrum analyzer, and NF value errors.

Figure 3:
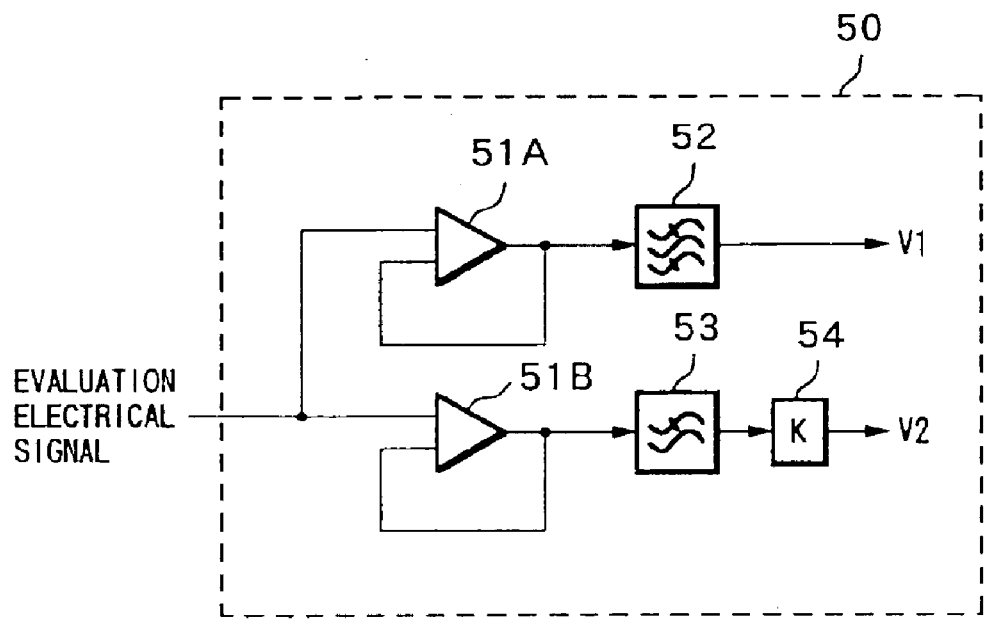
FIG. 3 shows an electric circuit composing a part of a reception characteristics measuring section in the first embodiment of the present invention.

Accordingly, in the reception characteristics measurement section 42G of the present embodiment, the arrangement is such that the transmission characteristics of the received optical signal are evaluated by using, for example, an electric circuit as shown in FIG. 3.

A circuit 50 shown in FIG. 3 composes a portion of the reception characteristics measurement section 42G. To be specific, it comprises: amplifier circuits 51A, 51B into each of which an electrical signal for reception characteristics evaluation is input; a bandpass filter 52 into which the output signal from the amplifier circuit 51A is input; a low-pass filter 53 into which the output signal from the amplifier circuit 51B is input; and a K multiplication circuit 54 which multiplies a voltage value of the output signal from the low-pass filter 54 by K.

The electrical signal for reception characteristics evaluation can be, for example, a signal obtained by branching off a part from the electrical signal equalization amplified by the equalizing amplifier 42D shown in FIG. 2 described above. The amplifier circuit 51A amplifies the electrical signal for reception characteristics evaluation to a required voltage level and transmits it to the bandpass filter 52. The amplifier circuit 51B amplifies the electrical signal for reception characteristics evaluation to a required voltage level and transmits it to the low-pass filter 53.

Figure 4:
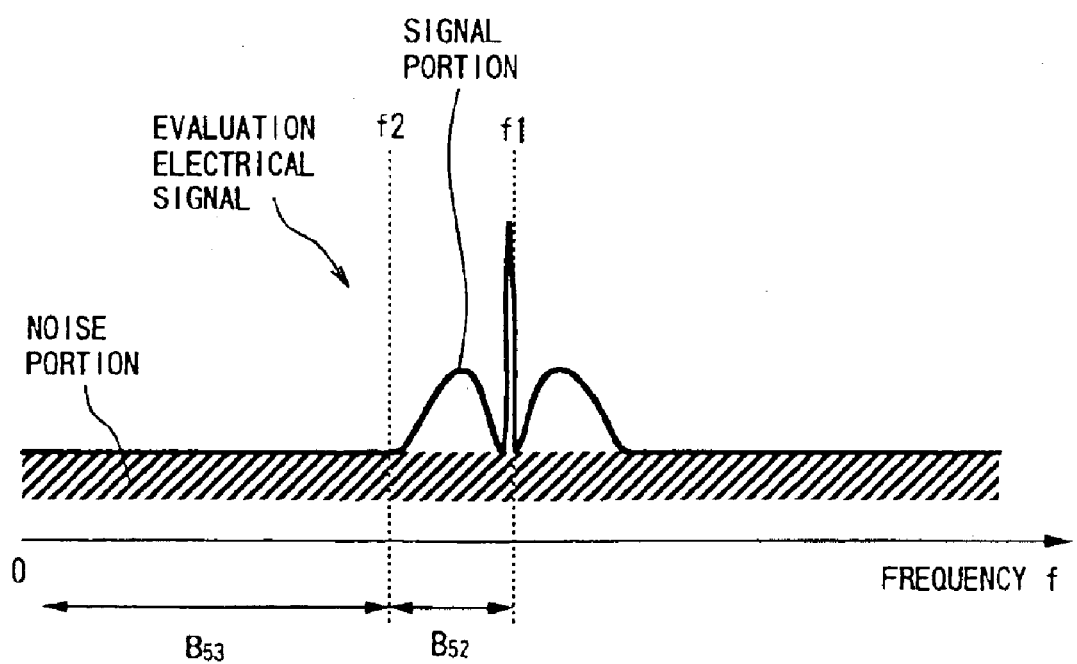
FIG. 4 is a diagram explaining the operation of the electric circuit of FIG. 3.

The bandpass filter 52, as shown in FIG. 4, has a pass band $B_{52}$ in the frequency range f2~f1. Furthermore, the low-pass filter 53 has a pass band $B_{53}$ in the frequency range below f2. Here, the frequency f1 is set corresponding to the lowest frequency of the high frequency components removed by the equalizing amplifier 42D. The frequency f2 is set to the frequency of when the number of zeros in a series of the received data is the largest (for example 13, etc.) at a time of scramble. A signal in the band $B_{52}$ extracted by the bandpass filter 52 is converted to DC to be output as a voltage value V1.

After converting the signal in the band $B_{53}$ extracted by the low-pass filter 53 to DC, the K multiplication circuit 54 multiplies the value by a constant value K and outputs it as a voltage value V2. Here, the constant value K is determined by using the following equation (1).

$$K=(f1-f2)/f2 \qquad (1)$$

That is to say, the signal passed through the low-pass filter 53 is the noise component, corresponding to the band $B_{53}$ in FIG. 4. On the other hand, the noise component that is necessary to obtain the signal to noise ratio is a part corresponding to the band $B_{52}$. Therefore, if the noise component in the band $B_{53}$ extracted by the low-pass filter 53 is multiplied by K according to the abovementioned equation (1), the noise component in the band $B_{52}$ can be obtained.

In the circuit 50 with a construction as described above, the voltage value V1 output from the bandpass filter 52 represents the sum of the signal component level and noise component level within the frequency range f2~f1, and the voltage value V2 represents the noise component level within the frequency range f2~f1. Accordingly, the signal to noise ratio (S/N) of the electrical signal for reception char acteristics evaluation, in other words, the signal to noise ratio in the electrical stage of the received optical signal, can be calculated by using the following equation (2).

$$S/N = (S+N-N)/N \qquad (2)$$
$$= \{(S+N)/N\} - 1$$
$$= (V1/V2) - 1$$

where S represents the signal component, and N represents the noise component.

By using the circuit 50 as described above, it is possible to measure the electrical signal to noise ratio of the received optical signal easily. If both of the OSNR (optical signal to noise ratio) and BER relationships corresponding to this electrical signal to noise ratio are measured in advance, and the relationships are normalized and stored as conversion data in the reception characteristics measurement section 42G, it is possible to convert the electrical signal to noise ratio measured by the circuit 50 into the OSNR and BER. In this manner, the OSNR and BER of the received optical signal can be obtained without using any high performance optical spectrum analyzer.

Here, in the abovementioned example, the conversion data is stored in the reception characteristics measurement section 42G. However, the present invention is not limit to this. For example, the data may be stored in the control section 43 so that the conversion of data is performed in the control section 43.

Furthermore, the case is shown where the BER is obtained by using the electrical signal to noise ratio. However, for example in the case where a forwarded error correction device (FEC) is provided inside the optical receiver, the BER may be obtained based on the error number in the forwarded error correction device.

Next is a description of the operation of a first embodiment.

With the WDM optical communication system of the construction as mentioned above, for example, if the transmission of WDM signal light from the terminal station 1W to the terminal station 1E is considered, the optical signals of λ1~λ2 output from the respective optical transmitter of the terminal station 1W, after being wavelength multiplexed in the WDM apparatus 11, is repeatedly transmitted to the terminal station 1E via the WE line of the optical transmission path L. At the terminal station 1E, the repeatedly transmitted WDM signal light is demultiplexed into wavelengths λ1~λn in the WDM apparatus 21, and is then received and processed by each optical receiver. At this time in each optical receiver corresponding to wavelengths λ1~λn, the electrical signal to noise ratio of the received optical signal is measured by the reception characteristics measurement section 42G, and converted into the OSNR and BER by using conversion data. The obtained OSNR and BER are transmitted to the OH processing section 41A at the optical transmitting end via the control section 43, as the reception information of the corresponding wavelength. Then, in the OH processing section 41A, the reception information is superimposed on the overhead information of the optical signal to be transmitted from the terminal station 1E to the terminal station 1W, and is repeatedly transmitted to the terminal station 1W via the EW line of the optical transmission path L.

At the terminal station 1W, which receives the WDM signal light from the terminal station 1E, the respective optical signals demultiplexed into wavelengths λ1~λn by the WDM apparatus 12 are received and processed by the corresponding respective optical receiver. At this time, the reception information contained in the overhead information of the received optical signal is identified by each OH processing section 42F for transmission to each control section 43.

In each control section 43, based on the corresponding OSNR and BER of the wavelengths (λ1~λn) that are measured at the terminal station 1E, control signals for controlling the operating conditions of the modulator 41C, the variable dispersion compensator 41D and the variable optical attenuator 41E at the transmitting end are generated. To be specific, the setting of the parameter a of the modulator 41C, the setting of the dispersion compensation amount of the variable dispersion compensator 41D, and the setting of the optical attenuation amount (pre-emphasis) of the variable optical attenuator 41E are feedback controlled such that the OSNR obtained at the receiving end satisfies the OSNR limitation of the optical receiver, and also the BER satisfies a target value (for example, BER=$10^{-15}$) set in advance.

Here, with regard to the wavelengths λ1~λn, the operating conditions of the variable dispersion compensator 42A, the variable PMD compensator 42B and the 0/1 judgment section 42E, which are provided at the receiving end (the terminal station 1E side), are feedback controlled by the respective control section 43 corresponding to the OSNR and BER measured by the respective reception characteristics measurement section 42G on the terminal station 1E side.

As a specific example of control algorithm, a case will now be briefly described where the operating condition of each device is feedback controlled based on the BER obtained by the optical receiver. Here, the present invention is not limited to the following control algorithm. Furthermore, a case where each device is feedback controlled based on the OSNR is also similarly considered.

For the control algorithm of the abovementioned case, for example, when the BER is obtained by the optical receiver, firstly the PMD compensation amount of the variable PMD compensator 42B of the optical receiver is adjusted and feedback controlled such that the BER value to be measured is optimized. Then, when the optimized BER information is transmitted to the receiving end via the line on the opposing side as described above, depending on the BER information, the setting of the parameter α of the modulator 41C, the dispersion compensation amount of the variable dispersion compensator 41D at the transmitting end, and the dispersion compensation amount of the variable dispersion compensator 42A at the receiving end are adjusted and feedback controlled such that the BER is optimized. When the BER of each wavelength satisfies the target value by the abovementioned feedback control, the optical attenuation amount of the variable optical attenuator 41E at the transmitting end is adjusted, and the setting of pre-emphasis is feedback controlled such that the BER is optimized. By repeating the control algorithm sequence mentioned above, optimization of transmission conditions of the system can be achieved.

As mentioned above, the OSNR and BER information of each of the optical signals of wavelengths λ1~λn measured at the terminal station 1E is superimposed onto the overhead information of each of the optical signals of wavelengths λ1~λn to be transmitted to the terminal station 1W at the transmitting end, and feedback control of such as pre-emphasis and parameter α is performed depending on the OSNR and BER, so that it is possible to obtain optimal transmission conditions. In particular, control is performed depending on the reception information including not only the OSNR but also the BER, so that degradation of transmission characteristics due to the influence of nonlinear optical effects can also be compensated for reliably.

Here, transmission of WDM signal light (wavelengths λ1~λn) from the terminal station 1W to the terminal station 1E has been described. However, transmission of WDM signal light (wavelengths λ1~λn) from the terminal station 1E to the terminal station 1W is also treated similarly to this, and hence the description here is omitted.

Next is a description of a second embodiment.

In the first embodiment mentioned above, the construction is such that the reception information of the OSNR and BER obtained at the receiving end is superimposed on the overhead information of the optical signal transmitted on the opposing line, and forwarded to the transmitting end. However in the second embodiment, a case is considered where the reception information of the OSNR and BER is transmitted on an optical supervisory channel (OSC), so that the operating conditions of the WDM apparatus inside the station, the optical amplifiers arranged on the optical transmission path L, and the like can be controlled depending on the OSNR and BER.

Figure 5:
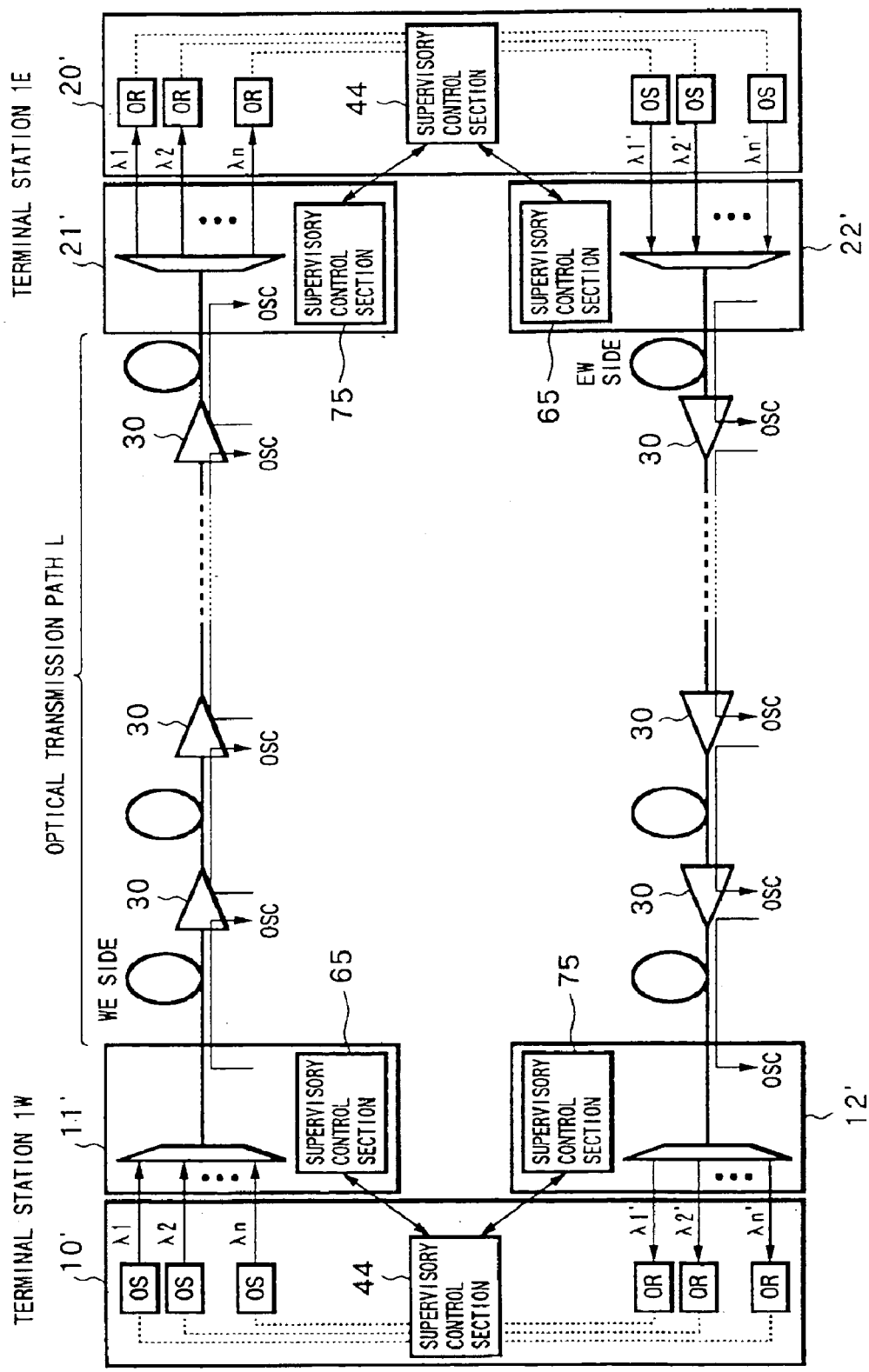
FIG. 5 shows the structure of a WDM optical communication system according to a second embodiment of the present invention.

FIG. 5 shows the structure of a WDM optical communication system according to the second embodiment. Here, the same symbols are used for the same structures as in the first embodiment, and this is the same hereunder.

In FIG. 5, the point of difference in the structure of the present WDM optical communication system from that in the first embodiment is that the transmitter and receiver stations 1W and 1E are provided with transmitter-receiver units 10' and 20', and WDM apparatuses 11', 12', 21', 22', respectively, each of which has a supervisory control section therein, and the supervisory control sections inside the same station are connected to each other. A system constructed like this is also suitable, for example, as a land based WDM optical communication system.

Figure 6:
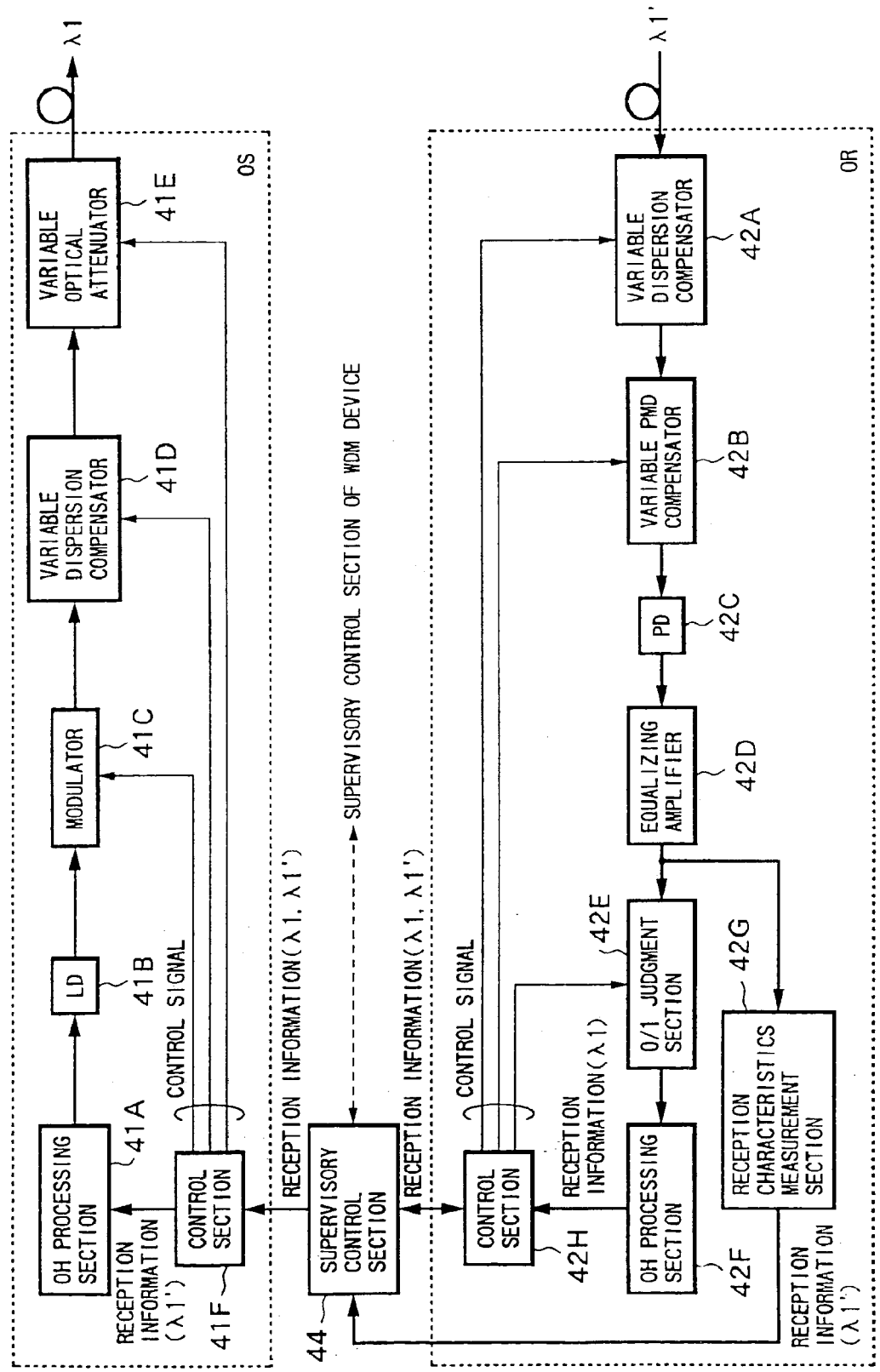
FIG. 6 is a block diagram showing a structural example of an optical transmitter and optical receiver of a transmitter-receiver unit in the second embodiment of the present invention.

FIG. 6 is a block diagram showing a structural example of an optical transmitter OS and an optical receiver OR corresponding to the wavelength λ1 and wavelength λ1' with regard to the transmitter-receiver unit 10'. Here, a structural example corresponding only to the wavelengths λ1, λ1' is described. However, the construction of the optical transmitters and optical receivers corresponding to each of the other wavelengths λ2~λn, λ2'~λn' and the construction of the optical transmitters and optical receivers corresponding to each of the wavelengths λ1'~λn', λ1~λn of a transmitter-receiver 20' are similar.

In the structural example in FIG. 6, an optical transmitter OS (upper part of the figure) that transmits an optical signal of wavelength λ1, and an optical receiver OR (lower part of the figure) that receives an optical signal of wavelength λ1' are connected via a supervisory control section 44. The optical transmitter OS has an OH processing section 41A, a laser source (LD) 41B, a modulator 41C, a variable dispersion compensator 41D, and a variable optical attenuator 41E similar to the case of the first embodiment, and is also provided with a control section 41 F which feedback controls the setting of the parameter α of the modulator 41C, the setting of the dispersion compensation amount of the variable dispersion compensator 41D, and the setting of the optical attenuation amount (pre-emphasis) of the variable optical attenuator 41E depending on the reception information about the wavelength λ1. Furthermore, the optical receiver OR has a variable dispersion compensator 42A, am variable PMD compensator 42B, a photodetector (PD) 42C, an equalizing amplifier 42D, a 0/1 judgment section 42E, an OH processing section 42F and a reception characteristics measurement section 42G, and is also provided with a control section 42H which feedback controls the setting of the dispersion compensation amount of the variable dispersion compensator 42A, the setting of the PMD compensation amount of the variable PMD compensator 42B, and the decision point of the 0/1 judgment section 42E depending on the reception information about the wavelength λ1'.

Each supervisory control section 44 of the transmitter-receiver units 10' and 20' receives the reception information transmitted from the optical receivers OR, transfers the reception information to the respective corresponding optical transmitters, and also transfers it to the supervisory control section in each WDM apparatus inside the same station.

Figure 7:
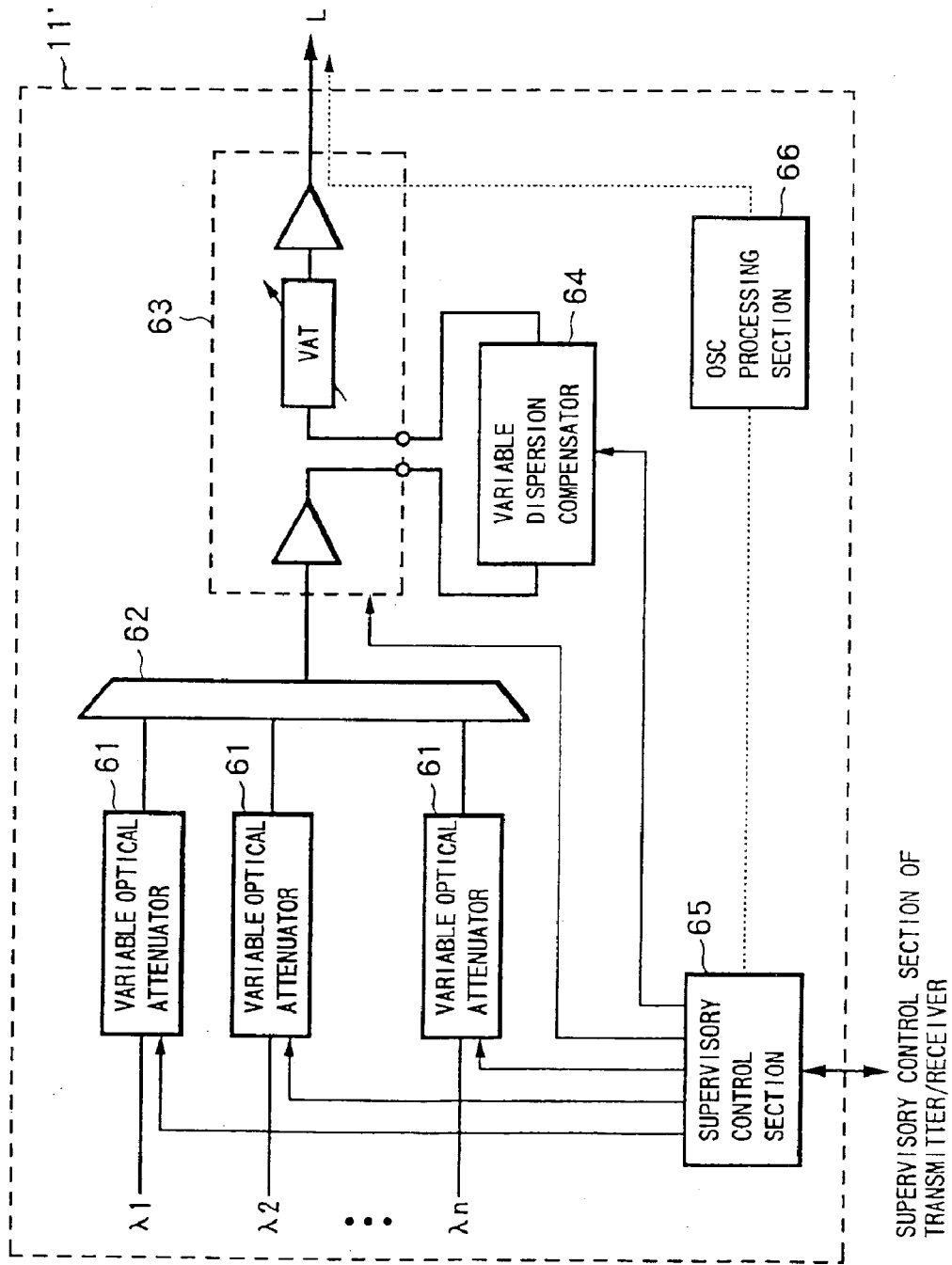
FIG. 7 is a block diagram showing a structural example of a WDM apparatus at the transmitting end in the second embodiment of the present invention.

FIG. 7 is a block diagram showing a specific structural example of the WDM apparatus 11' that is mounted at the transmitting end of the terminal station 1W. Here, the construction of the WDM apparatus 22' that is mounted at the transmitting end of the terminal station 1E is the same as the WDM apparatus 11'.

In the structural example of FIG. 7, n variable optical attenuators 61 are installed corresponding to the optical signals of wavelengths λ1~λn that are transmitted from the transmitter-receiver unit 10', and the optical signals of wavelengths λ1~λn transmitted from the respective variable optical attenuators 61 are multiplexed in a WDM coupler 62. WDM signal light output from the WDM coupler 62 is amplified to a required level by an erbium doped optical fiber amplifier (EDFA) 63, and transmitted to the WE line of the optical transmission path L. Here, the abovementioned EDFA has, for example, a two stage amplification structure, and is provided with a variable optical attenuator (VAT) between a former stage optical amplification section and a latter stage optical amplification section to perform automatic level control (ALC) for controlling output optical power to be almost constant. Furthermore, a variable dispersion compensator 64 is connected to terminals installed between the stages in the EDFA 63, in which compensation is performed for the wavelength dispersion that occurs in the optical transmission path L.

The light attenuation amount of each variable optical attenuator 61 on the input side of the WDM coupler 62, the drive condition of the EDFA 63, and the dispersion compensation amount of the variable dispersion compensator 64 are controlled by control signals output from a supervisory control section 65. This supervisory control section 65 of the WDM apparatus 11' feedback controls the operating conditions of the respective variable optical attenuators 61, the EDFA 63, and the variable dispersion compensator 64 depending on the reception information (OSNR, BER) of each wavelength λ1~λn which is transmitted from the supervisory control section 44 of the transmitter-receiver unit 10'. Furthermore, the supervisory control section 65 has a function for transmitting the reception information about each wavelength λ1~λn to an OSC processing section 66. Here, by feedback controlling the drive condition of the EDFA 63 depending on the reception information, output tilt correction and output adjustment (corresponding to ASE correction) of the EDFA 63 is performed.

The OSC processing section 66 generates an OSC signal containing the reception information transmitted from the supervisory control section 65. This OSC signal is an optical signal whose wavelength is different from all of the optical signals of wavelengths λ1~λn. Here in the latter stage optical amplification section and the like of the EDFA 63 for example, the OSC signal is multiplexed into the WDM signal light and transmitted along the optical transmission path L, and is transferred to the next stage optical amplifier (optical repeater) 30.

Here, in the present embodiment, the variable optical attenuator 41E is provided inside the optical transmitter OS for each wavelength of the transmitter-receiver unit 10' and, further, the variable optical attenuator 61 is also provided in the WDM apparatus 11' at the transmitting end. However, a variable optical attenuator for performing pre-emphasis may be installed in either the optical transmitter OS of each wavelength or the WDM apparatus 11'. This is the same with the variable dispersion compensator 41D in each optical transmitter OS and the variable dispersion compensator 64 in the WDM apparatus 11'. Furthermore, the structural example of FIG. 7 can be used as the transmitting section of an optical add and drop multiplexer (OADM).

Figure 8:
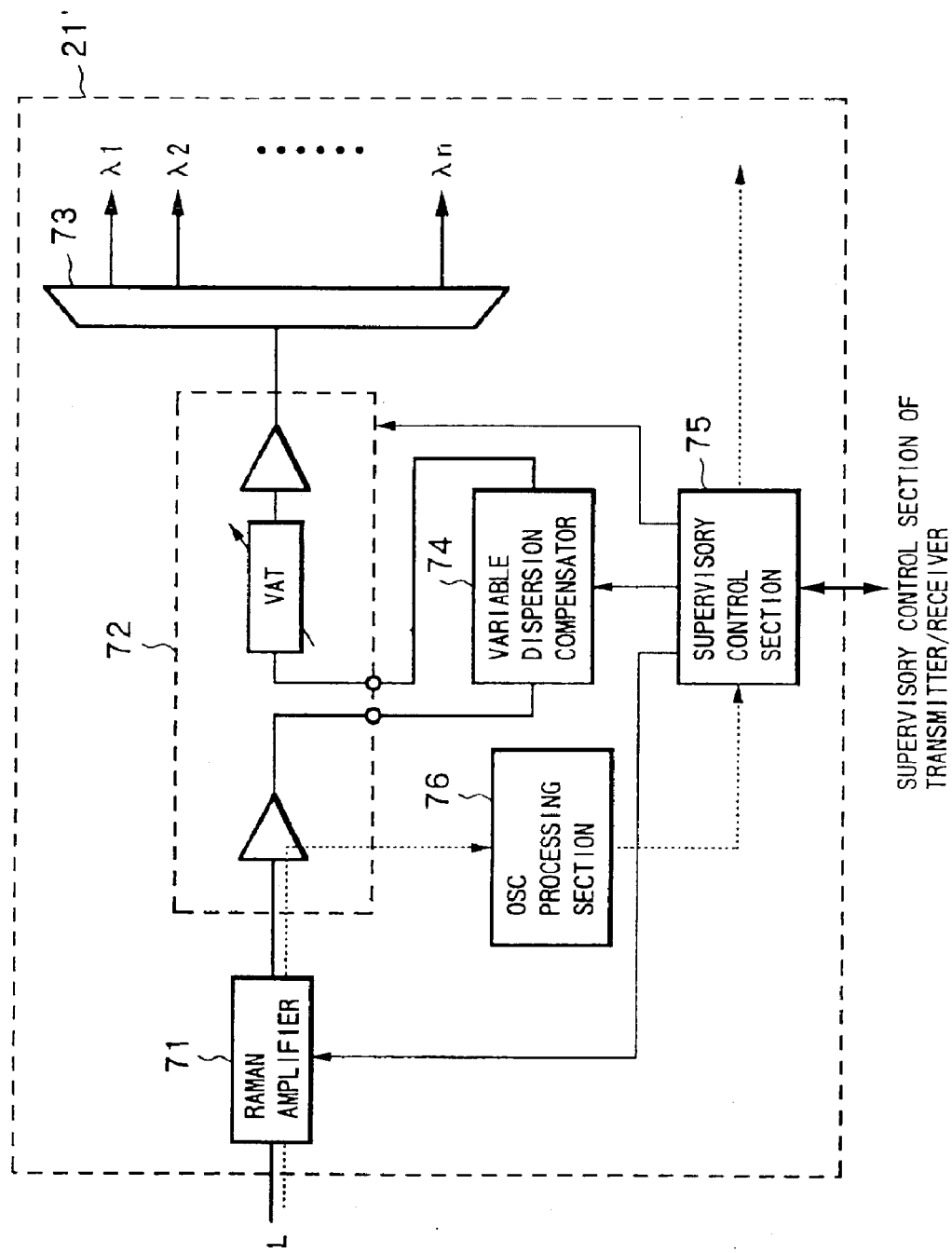
FIG. 8 is a block diagram showing a structural example of a WDM apparatus at the receiving end in the second embodiment of the present invention.

FIG. 8 is a block diagram showing a specific structural example of the WDM apparatus 21', which is arranged at the receiving end of the terminal station 1E. Here, the construction of the WDM apparatus 12', which is arranged at the receiving end of the terminal station 1W, is the same as the WDM apparatus 21'

In the structural example of FIG. 8, the WDM signal light of wavelengths λ1~n transmitted along the WE line of the optical transmission path L is input to an EDFA 72 via a Raman amplifier 71. The Raman amplifier 71 is a well known optical amplifier that generates Raman excitation light in a required waveband, and supplies the Raman excitation light to the optical transmission path L connected to the present WDM apparatus 21' so that WDM signal light propagated through the optical transmission path L is Raman amplified. The EDFA 72 has the same construction as the aforementioned EDFA 63, wherein a variable dispersion compensator 74 is also connected between the former stage optical amplification section and a variable optical attenuator (VAT). The WDM signal light, amplified to the required level in the EDFA 72, is transmitted to a WDM coupler 73 and demultiplexed into the wavelengths λ1~λn.

The setting of the tilt variable function of the Raman amplifier 71, the drive condition of the EDFA 72, and the dispersion compensation amount of the variable dispersion compensator 74 are controlled by control signals output from a supervisory control section 75. Depending on the reception information (OSNR, BER) about the wavelengths λ1~λn which have been identified by an OSC processing section 76, the supervisory control section 75 of the WDM apparatus 21' feedback controls the operating conditions of the Raman amplifier 71, the EDFA 72 and the variable dispersion compensator 74. The abovementioned OSC processing section 76 demultiplexes an OSC signal transmitted along the optical transmission path L with the WDM signal light, by the former stage optical amplification section of the EDFA 72 and the like for example, and identifies and processes the reception information about the wavelengths λ1~λn contained in the OSC signal to transmit to the supervisory control section 75. Furthermore, the supervisory control section 75 has a function for transmitting the reception information about each wavelength λ1~λn to the supervisory control section of the transmitter-receiver unit 20'.

Here, the structural example of FIG. 8 can also be adapted for the receiving section of the optical add and drop multiplexer (OADM).

Figure 9:
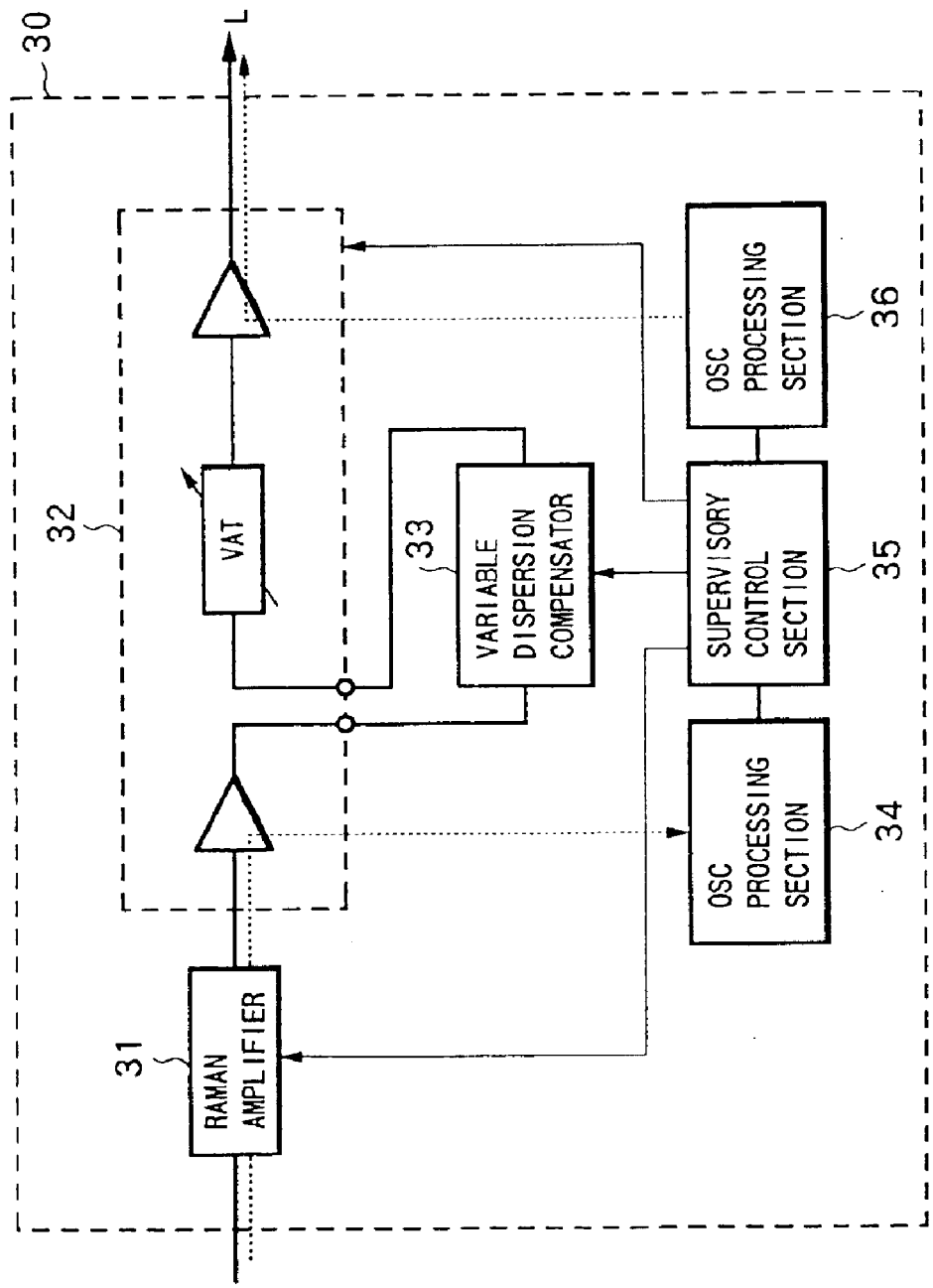
FIG. 9 is a block diagram showing a structural example of an optical amplifier arranged on an optical transmission path in the second embodiment of the present invention.

FIG. 9 is a block diagram showing a specific structural example of the optical amplifier (optical repeater) 30 mounted on the optical transmission path L.

In the construction of FIG. 9, the WDM signal light transmitted along the optical transmission path L is input to an EDFA 32 via a Raman amplifier 31. The Raman amplifier 31 is a well known optical amplifier that generates Raman excitation light in a required waveband, and supplies the Raman excitation light to the optical transmission path L connected to the present optical amplifier 30 so that a WDM signal light propagated through the optical transmission path L is Raman amplified. An EDFA 32 has the same construction as the aforementioned EDFA 63, EDFA72, wherein a variable dispersion compensator 33 is also connected between a former stage optical amplification section and a variable optical attenuator (VAT). The WDM signal light amplified to the required level in the EDFA 32 is again transmitted on the optical transmission path L, and is transmitted to the next stage optical amplifier 30 or the terminal station.

The OSC signal transmitted along the optical transmission path L with the WDM signal light is demultiplexed, for example, by the former stage optical amplification section of the EDFA 32 and the like, and transmitted to an OSC processing section 34. In the OSC processing section 34, the reception information (OSNR and BER) about each wavelength contained in the OSC signal is identified and processed, to be transmitted to a supervisory control section 35. In the supervisory control section 35, depending on the reception information from the OSC processing section 34, control signals are generated for feedback controlling the setting of the tilt variable function of the Raman amplifier 31, the drive condition of the EDFA 32, and the dispersion compensation amount of the variable dispersion compensator 33, and also the reception information about each wavelength is transmitted to an OSC processing section 36. In the OSC processing section 36, an OSC signal containing the reception information from the supervisory control section 35 is generated. This OSC signal is here for example, multiplexed in the WDM signal light by the latter stage optical amplification section of the EDFA 32 and the like, to be transmitted to the optical transmission path L.

Next is a description of the operation of the second embodiment.

In the WDM optical communication system of the construction described above, similarly to the operation in the case of the first embodiment, the operating conditions of the transmitter-receiver units 10' and 20' of the terminal stations 1W and 1E are feedback controlled based on the reception information of each wavelength, which is superimposed on the overhead information of each wavelength of the optical signal. Furthermore, the supervisory control sections of the transmitter-receiver unit 10' and the WDM apparatuses 11' and 12', and also the supervisory control sections of the transmitter-receiver unit 20' and the WDM apparatuses 21' and 22', are connected such that the reception information about each wavelength is transmitted, and hence the operating conditions of the variable optical attenuators and the like inside each of the WDM apparatuses are feedback controlled depending on the reception information. Moreover, the reception information about each wavelength is transmitted to each optical amplifier 30 on the optical transmission path L using the OSC signal, and hence the operating conditions of the Raman amplifier 31, the EDFA 32 and the like inside each optical amplifier 30 are also feedback controlled depending on the reception information.

According to the second embodiment mentioned above, the reception information about each wavelength is transmitted between the units inside the terminal station and between the optical amplifiers 30 on the optical transmission path L, and the feedback control is performed depending on the reception information such that the OSNR and BER that are measured at the receiving end satisfy the required value. As a result, more stable transmission characteristics can be realized.

Here, in the first and second embodiments mentioned above, the feedback control is performed depending on the OSNR and BER obtained at the receiving end on each of the modulator 41C, the variable dispersion compensator 41D and the variable optical attenuator 41E inside each optical transmitter OS, and each of the variable dispersion compensator 42A, the variable PMD compensator 42B, and the 0/1 judgment section 42E inside each optical receiver OR. However, with the present invention, devices that can adjust the settings of pre-emphasis and the parameter α may be feedback controlled at a minimum, and by feedback controlling the devices other than those mentioned above, it is possible to reduce the deviation of transmission characteristics with higher accuracy.

Next is a description of a third embodiment of the present invention.

Figure 10:
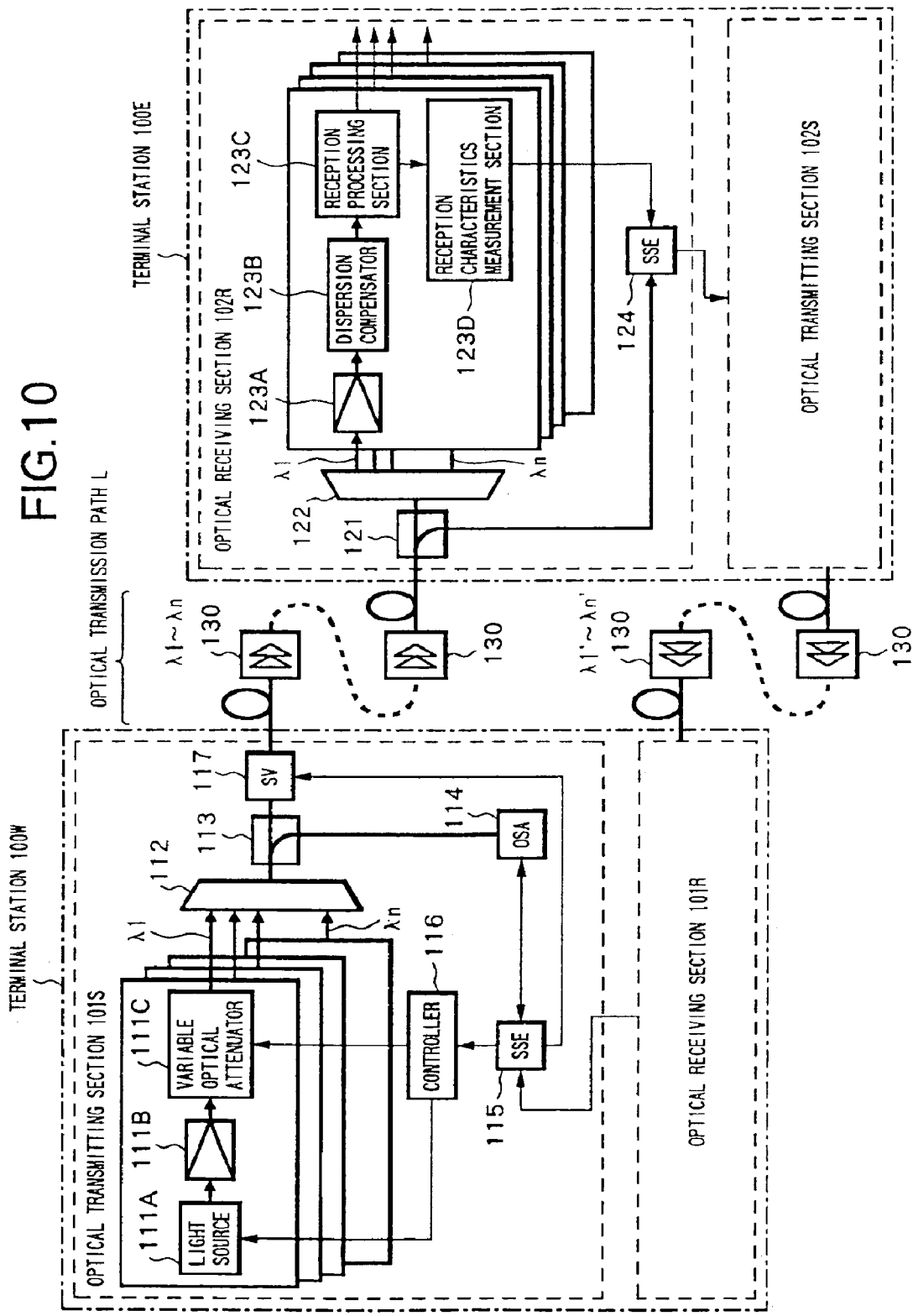
FIG. 10 shows the structure of a WDM optical communication system according to a third embodiment of the present invention.

FIG. 10 shows a structure of a WDM optical communication system according to the third embodiment.

In FIG. 10, the construction of the present WDM optical communication system is, similarly to the case in the first embodiment, for example that the two transmitter-receiver terminal stations, 100W and 100E, are connected by an optical transmission path L comprising two lines (WE side and EW side) of opposing transmission directions. In each line, a plurality of optical repeaters 130 is arranged at required repeater spacing. A system constructed as described hereunder is suitable, for example for a seabed WDM optical communication system.

The terminal station 100W has, for example, an optical transmitting section 101S and an optical receiving section 101R. The WDM signal light of wavelengths $\lambda 1 \sim \lambda n$, which is generated in the optical transmitting section 101S, is transmitted to the WE line of the optical transmission path L, and the WDM signal light of wavelengths $\lambda 1' \sim \lambda n'$ transmitted along the EW line of the optical transmission path L is received and processed by the optical receiving section 101R. The terminal station 100E also has an optical receiving section 102R and an optical transmitting section 102S, where the WDM signal light of wavelengths $\lambda 1 \sim \lambda n$ transmitted along the WE line of the optical transmission path L is received and processed by the optical receiving section 102R, and the WDM signal light of wavelengths $\lambda 1' \sim \lambda n'$ generated in the optical transmitting section 102S is transmitted to the EW line of the optical transmission path L.

The optical transmitting section 101S, for example, after multiplexing in a WDM coupler 112 the optical signals of wavelengths $\lambda 1 \sim \lambda n$ which are generated in n units each having a light source module 111A, an optical amplifier 111B and a variable optical attenuator 111C, transmits the multiplexed signal light to the WE line of the optical transmission path L via an optical branch devicel 113 and a supervisory control command processing section (SV) 117. The light source module 111A of each unit is a standard optical transmitter that generates optical signals with different wavelengths, which are modulated corresponding to the transmitted data. The optical amplifier 111B amplifies the optical signal output from the light source module 111A to a required level and outputs it. The variable optical attenuator 111C is for adjusting the power of the optical signal output from the unit, and an amount of light attenuation thereof is variably controlled by a controller 116. By adjusting the light attenuation amount of this variable optical attenuator 111C, pre-emphasis is performed on the transmitted light. Here in FIG. 10, the construction of the unit corresponding to only the wavelength $\lambda 1$ is illustrated. However, the constructions corresponding to the other wavelengths $\lambda 2 \sim \lambda n$ are the same as this.

The abovementioned controller 116, depending on the control signal transmitted from a system supervisory control equipment (SSE) 115, controls the operating conditions of the light source module 111A and the variable optical attenuator 111C of each unit. Control information about the wavelengths λ1~λn transmitted from the optical receiving section 101R on the opposing line is input into the supervisory control equipment 115 mentioned above. Here, the optical receiving section 101R on the opposing line has the same construction as the optical receiving section 102R in the terminal station 100E to be mentioned later. Furthermore, the system supervisory control equipment 115 is also input with a result measured by an optical spectrum analyzer (OSA) 114, and generates the aforementioned control signal for transmitting to the controller 116 depending on the control information from the optical receiving section 101R and spectrum information of the WDM signal light output from the WDM coupler 112. Moreover, the system supervisory control equipment 115 has a function for transferring the control information of the wavelengths λ1~λn to a supervisory control command processing section 117. The supervisory control command processing section 117 superimposes the supervisory control signal containing the transferred control information onto the transiting light of the optical branch device 113, and transmits it to the optical transmission path L with the WDM signal light of wavelengths λ1~λn.

In the optical receiving section 102R in the terminal station 100E, WDM signal light from the WE line of the optical transmission path L is input into a WDM coupler 122 via an optical branch device 121, and demultiplexed into optical signals of wavelengths λ1~λn. Each optical signal demultiplexed in the WDM coupler 122 is transmitted to a corresponding unit for each wavelength λ1~λn, each of which has an optical amplifier 123A, a dispersion compensator 123B, a reception processing section 123C, and a reception characteristics measurement section 123D.

The optical amplifier 123A amplifies the optical signal demultiplexed in the WDM coupler 122 up to a required level and outputs this. The dispersion compensator 123B is a well-known wavelength dispersion compensation device for compensating for wavelength dispersion that is generated in the optical transmission path L. The reception processing section 123C is a circuit which converts an optical signal whose dispersion is compensated for in the dispersion compensator 123B into an electrical signal, and performs discrimination decision processing and the like of the transmitted data.

The reception characteristics measurement section 123D measures the signal to noise ratio and the transmission error rate of the received optical signal. To be specific, the arrangement may be such that, similar to the case in the first embodiment mentioned above, the signal to noise ratio is measured using the circuit 50 as shown in FIG. 3, and the OSNR and BER are obtained based on the result Furthermore, in the case where the reception processing section 123C is provided with a forwarded error corrector (FEC), it is also possible to obtain the BER based on the error number in the error corrector. Moreover, the Q value of the received light is measured using a Q monitor, and the measured value may be designated as the transmission error rate.

The OSNR and BER (or Q value) obtained in the reception characteristics measurement section 123D of the unit corresponding to each of the wavelengths λ1~λn is transmitted to a system supervisory control equipment (SSE) 124. In this system supervisory control equipment 124, control information for feedback controlling pre-emphasis at the transmitting end and Raman amplification in each optical repeater 130 is generated based on the OSNR and BER (or Q value) from each reception characteristics measurement section 123D. The control information is mounted on the overhead information of the optical signal transmitted along the EW line, to be transmitted to the terminal station 100W, and further transmitted to the optical transmitting section 101S and each optical repeater 130 on the WE line. Furthermore, WDM signal light that is branched in the optical branch device 121 is input into the system supervisory control equipment 124 of the optical receiving section 102R, in which the control information of the wavelengths λ1'~λn' in the overhead information contained in the WDM signal light is identified and processed. The control information of the wavelengths λ1'~λn', which is identified in the system supervisory control equipment 124, is transmitted to the optical transmitting section 102S of the opposing line. Here, the optical transmitting section 102S has the same construction as the optical transmitting section 101S in the abovementioned station 100W.

Figure 11:
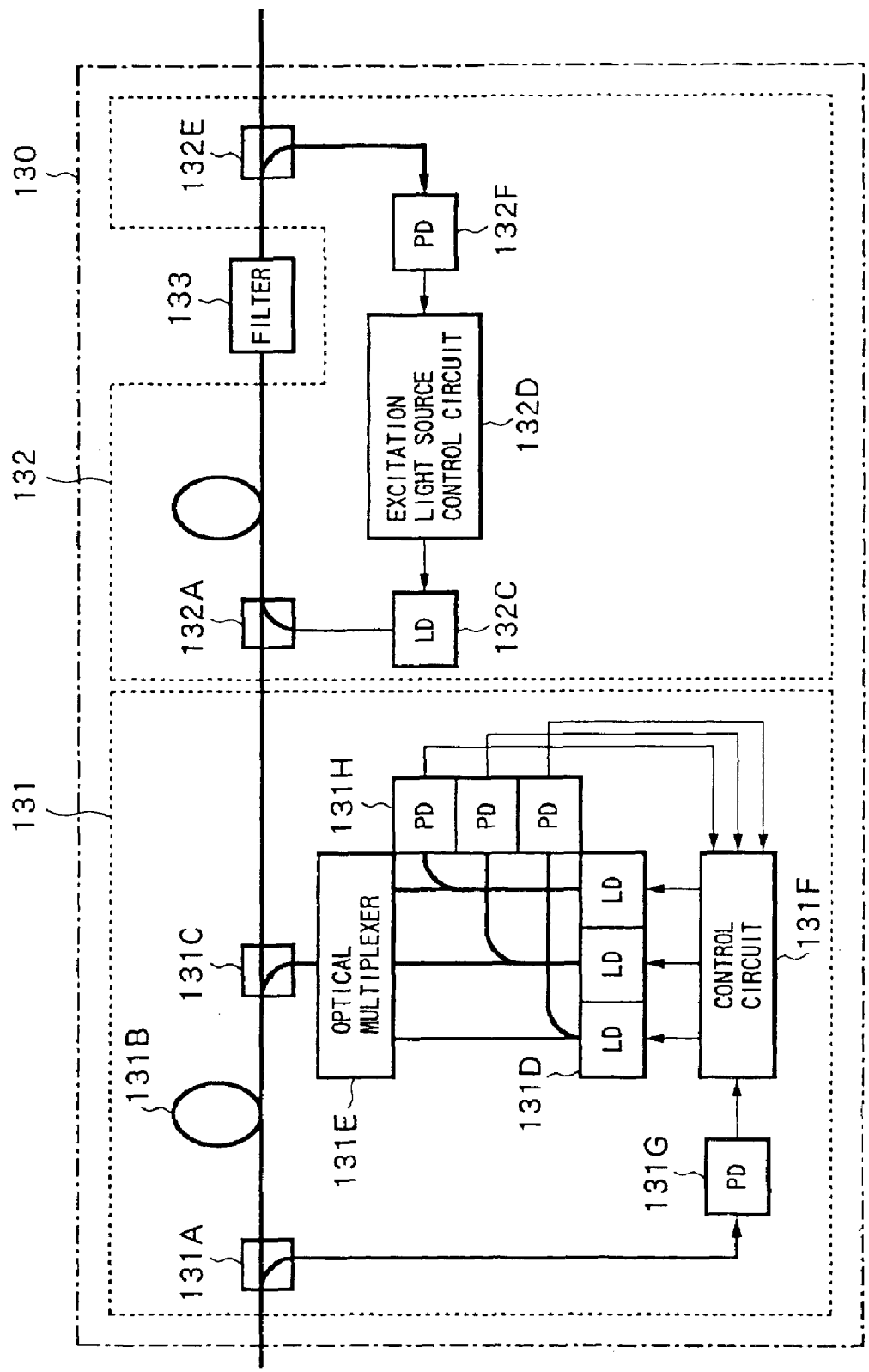
FIG. 11 is a block diagram showing a structural example of an optical repeater in the third embodiment of the present invention.

FIG. 11 is a block diagram showing a specific structural example of the optical repeater 130.

In the structural example of FIG. 11, the optical repeater 130 is provided with a Raman amplifier 131, an EDFA 132 and a gain equalization filter 133. In the Raman amplifier 131, WDM signal light propagated through the optical transmission path L is input into a Raman amplification fiber 131B via an optical branch device 131A. Raman excitation light is applied to this Raman amplification fiber 131B via an optical multiplexer 131C, which amplifies the passing WDM signal light.

Regarding the abovementioned Raman excitation light, here for example, the excitation light output from each of three different Raman excitation light sources (LD) 131D are multiplexed in the optical multiplexer 131E, and further applied to the Raman amplification fiber 131B through the rear thereof by the optical multiplexer 131C. For each Raman excitation light source 131D, for example, in the case of attempting to obtain a large Raman gain in the proximity of wavelength of 1580 nm, the wavelength of the excitation light may be selected to be greater than or equal to 1460 nm. To be specific, it is possible to set 1470 nm, 1485 nm and 1500 nm for the wavelengths of the three Raman excitation lights. Here, the number of Raman excitation light sources and wavebands are not limited to the abovementioned example.

A control circuit 131F is a circuit for controlling the driving conditions of the respective Raman excitation light source 131D, into which is input a signal that is branched in the optical branch device 131A and converted into an electrical signal by a photodetector (PD) 131G, and a signal that is obtained by converting a part of the light output from each Raman excitation light source 131D into an electrical signal by a corresponding photodetector (PD) 131H. In this control circuit 131F, a supervisory control signal that is superimposed on the output signal from the photodetector 131G is identified, generation conditions of the Raman amplification are determined with reference to the output signal from each photodetector 131H, and the driving condition of each of the Raman excitation light sources 131D is controlled. Here, the optical branch device 131A is positioned in the input port of the optical repeater 130. However, the optical branch device 131A may be positioned differently from this, for example, in the output port of the optical repeater 130, the output port of the Raman amplifier 131, or the output port of the EDFA 132.

Here, the Raman excitation light, which has passed through the Raman amplification fiber 131B, causes Raman amplification of the optical signal that is entered into the optical transmission path L from the input port section of the present optical repeater 130 to be propagated through the fiber of the optical transmission path L.

In the EDFA 132, for example, WDM signal light output from the Raman amplifier 131 is input into an erbium doped fiber (EDF) 132B via an optical multiplexer 132A. Excitation light, for example whose wavelength is 980 nm or 1480 nm that is generated in the excitation light source (LD) 132C, is supplied to this EDF 132B via the optical multiplexer 132A. The WDM signal light, which is amplified by the stimulated emission effect of the EDF 132B, is output to the optical transmission path L connected to the output side of the present optical repeater 130 via the gain equalization filter 133 and the optical branch device 32 E.

Furthermore, the driving condition of an excitation light source 132C is automatically controlled by an excitation light source control circuit 132D. A part of the WDM signal light that has passed through the gain equalization filter 133 is branched by an optical branch device 132E, and the branched signal is converted into an electrical signal by a photodetector (PD) 132F to be input to the excitation light source control circuit 132D. This excitation light source control circuit 132D then performs so-called automatic level control (ALC) for controlling the driving condition of the excitation light source 132C such that the output signal level of the photodetector 132F becomes constant.

Here, the gain equalization filter 133 is a fixed optical filter having loss wavelength characteristics such as to negate the gain wavelength characteristics of the EDFA 132. Furthermore, here each excitation light source in the optical repeater 130 is constructed as a separate unit. However, a plurality of excitation light sources may be combined to form a redundant structure.

Next is a description of the operation of the third embodiment.

In the present WDM optical communication system having the abovementioned construction, for example, when the transmission of WDM signal light from the terminal station 100W to the terminal station 100E is considered, the WDM signal light of wavelengths $\lambda 1\sim\lambda n$ output from the optical transmitting section 101S in the terminal station 100W is repeatedly transmitted to the terminal station 100E via the WE line of the optical transmission path L and the optical repeaters 130.

In the terminal station 100E, the WDM signal light transmitted is input into the optical receiving section 102R, and after being demultiplexed into wavelengths $\lambda 1\sim\lambda n$ by the WDM coupler 122, it is received and processed in the unit corresponding to each wavelength. At this time, in each unit, the OSNR and BER (or Q value) of the received optical signal are measured in the reception characteristics measurement section 123D, and transmitted to the system supervisory control equipment 124 as reception information. In the system supervisory control equipment 124, control information about the wavelengths $\lambda 1\sim\lambda n$ for feedback controlling pre-emphasis at the transmitting end and the Raman amplification in each optical repeater 130 on the WE line is generated based on the reception information obtained in each reception characteristics measurement section 123D. Then, the abovementioned control information about the wavelength $\lambda 1\sim\lambda n$ is transmitted to the optical transmitting section 102S, superimposed on the overhead information of the optical signal each wavelength $\lambda 1'\sim\lambda n'$, and repeatedly transmitted to the terminal station 100W via the EW line of the optical transmission path L.

In the terminal station 100W, which has received the WDM signal light from the terminal station 100E, each wavelength $\lambda 1\sim\lambda n$ of the optical signal is received and processed in the optical receiving section 101R, and control information contained in the overhead information of the WDM signal light is identified and transmitted to the system supervisory control equipment 115 of the optical transmitting section 101S. Then, in the system supervisory control equipment 115, based on the control information about the wavelengths $\lambda 1\sim\lambda n$ from the optical receiving section 101R and the measurement result of an optical spectrum analyzer 114, an instruction for controlling pre-emphasis is transmitted to a controller 116, and the control information about the wavelengths $\lambda 1\sim\lambda n$ is transmitted to a supervisory control command processing section 117.

In the controller 116, depending on an instruction from the system supervisory control equipment 115, the operating conditions of the light source module 111A and the variable optical attenuator 111C in each unit are controlled. Specific control algorithm will be described later. In the supervisory control command processing section 117, the control information about the wavelengths $\lambda 1\sim\lambda n$ transmitted from the system supervisory control equipment 115 is mounted on the supervisory control signal superimposed on the WDM signal light of the wavelengths $\lambda 1\sim\lambda n$, to be transmitted to each optical repeater 130 on the WE line.

In each optical repeater 130 on the WE line of the optical transmission path L, the WDM signal light from the optical transmission path L is input to the Raman amplification fiber 131B, a part of the WDM signal light is branched by the optical branch device 131A, and photo-electrically converted by the photodetector 131G, to be transmitted to the control circuit 131F. In the control circuit 131F, the supervisory control signal contained in the output signal of the photodetector 131G is extracted, the control information about the wavelengths $\lambda 1\sim\lambda n$ is identified, and the driving conditions of the respective Raman excitation light source 131D are controlled. Specific control algorithm of Raman amplification will be described later. The WDM signal light Raman amplified through the Raman amplification fiber 131B is amplified to a required level by the EDFA 132 that performs ALC operation. Furthermore, the gain-wavelength characteristics of the EDFA 132 are compensated for by the gain equalization filter 133.

A specific description of the optical amplification effects in each optical repeater 130 will now be given.

Figure 12:
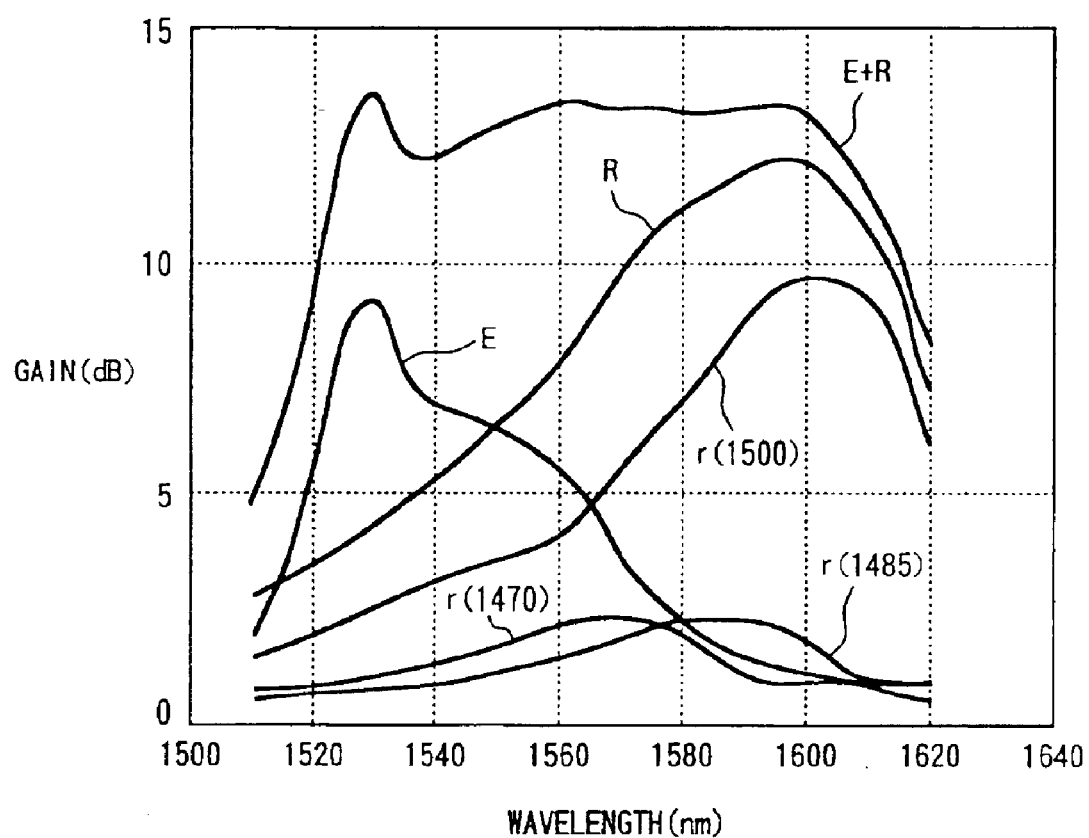
FIG. 12 is a diagram for explaining the optical amplification behavior in the optical repeater of FIG. 11.

Each optical repeater 130 realizes the expansion of the amplification band of the EDFA 132 by using Raman amplification. That is to say, since the amplification band of the EDFA 132 has a low gain on the long wavelength side (wavelength greater than 1560 nm) as indicated by characteristic E in FIG. 12, by combining the Raman amplifier 131 indicated by characteristic R in FIG. 12, which has a relatively high gain in this long waveband, it is possible to obtain a flat gain-wavelength characteristic over a wide waveband indicated by characteristic (E+R) in FIG. 12. Here, the gain-wavelength characteristic of the Raman amplifier 131 indicated by characteristic R is the gain-wavelength characteristic obtained by the combination of characteristic r (1470) of a Raman excitation light source with wavelength 1470 nm, characteristic r (1485) of a Raman excitation light source with wavelength 1485 nm, and characteristic r (1500) of a Raman excitation light source with wavelength 1500 nm.

For a method to unify the transmission characteristics of the optical signals of the respective wavelength, for example, there is the following control method. The output optical power of each optical repeater 130 is controlled to be constant by ALC operation of the EDFA 132. Accordingly, if the output optical power of the Raman amplifier 131 is increased, input optical power into the EDFA 132 is increased and the gain of the EDFA 132 is reduced, so that the gain-wavelength characteristic is changed and the gain on the long wavelength side is increased. On the other hand, if the output optical power of the Raman amplifier 131 is reduced, input optical power into the EDFA 132 is reduced and the gain of the EDFA 132 is reduced, so that the gain on the short wavelength side is increased.

Therefore, a control is performed such that by changing the output power of each Raman excitation light source 131D, the gain-wavelength characteristic of the Raman amplification is changed, so that the change of the EDFA 132 gain-wavelength characteristics is offset. The after transmission gain-wavelength characteristic G ($\lambda$) after the abovementioned control is performed for each optical repeater 130 can be represented by the following equation (3) in units of decibels (dB).

$$G(\lambda)=N[g(\lambda)\times(R_{ave}-R_{0ave})+(R(\lambda)-R_0(\lambda))]+G_0(\lambda) \quad (3)$$

where N represents the number of optical repeaters 130, $G_0$ ($\lambda$) the gain-wavelength characteristic before the optical repeater 130 is controlled, g ($\lambda$) the variation of the gain-wavelength characteristic when the gain in the EDFA 132 is increased by 1 dB, $R_{ave}$ the mean wavelength gain of gain-wavelength characteristics after the Raman amplifier 131 is controlled, $R_{0ave}$ the mean wavelength gain of gain-wavelength characteristics before the Raman amplifier 131 is controlled, R ($\lambda$) the gain-wavelength characteristic after the Raman amplifier 131 is controlled, and $R_O$ ($\lambda$) the gain-wavelength characteristic before the Raman amplifier 131 is controlled. The gain-wavelength characteristic of the Raman amplifier 131 is represented by R ($\lambda$)=$\Sigma R_i$ ($\lambda$), being the sum of the Raman gains $R_i$ ($\lambda$) of each Raman excitation light source 131D.

If the gain-wavelength characteristic, being the control target, is represented by $G_{ob}$ ($\lambda$), σdeviation a from the target gain for each wavelength $\lambda_l$ is represented by the following equation (4).

$$\sigma^2=\Sigma[G(\lambda_l)-G_{ob}(\lambda_l)]^2 \quad (4)$$

The Raman gain by each Raman excitation light source 131D can be obtained either by calculation based on the output value of each Raman excitation light or experimentally. Therefore, in a condition where the output of the Raman excitation light source is limited, a variation in the output value of each Raman excitation light is obtained such that the deviation $\sigma^2$ in the abovementioned equation (4) becomes small, and the driving condition of each Raman excitation light source 131D is thus controlled.

For example, a case is considered where, by insertion of optical fibers in the optical transmission path L and the like, a loss of about 1 dB occurs on the optical transmission path L, and a slope occurs on the gain-wavelength characteristic. In this case, since the EDFA 132 performs ALC operation to keep the output optical power of the optical repeater 130 constant, the gain of the EDFA 132 is increased by +1 dB, and the gain-wavelength characteristic of the EDFA 132 has a slope with the gain increasing on the short wavelength side. In such a situation, if a control is performed such that the mean gain of the Raman amplifier 131 is increased by about +0.8 dB, the gain increase of the EDFA 132 is reduced from +1 dB to +0.2 dB, and hence the gain slope becomes smaller than before the control. Furthermore, the mean gain of the overall Raman amplification is increased, and hence, the gain slope on the long wave side is increased in the Raman amplifier 131. In this manner, a change in the gain slope of the EDFA 132 caused by a gain increase of +0.2 dB is offset by a change in the gain slope of the Raman amplifier 131 to some degree. Lastly, for the deviation of the rest of the gain-wavelength characteristics, by changing the output power balance of each Raman excitation light source 131D by a degree of less than or equal to 0.1 dB, it is possible to obtain flat gain wavelength characteristics for the optical repeater 130 as a whole.

Here, in the abovementioned example, the case is shown where the optimization control of Raman amplification and pre-emphasis are repeated, and as a result, the ratio of the amounts of correction by Raman amplification control and by pre-emphasis control is 4:1. However, the ratio of the amounts of correction by the two controls may be set by examining in advance the ratio by which optimal transmission characteristics can be realized.

Next is a description of specific control algorithm for pre-emphasis at the transmitting end and Raman amplification in each optical repeater 130 as mentioned above.

Here, one example is considered in which, depending on the OSNR and BER (or Q value) obtained at the receiving end, after the Raman excitation light source 131D of each optical repeater 130 is adjusted to control the Raman amplification, the variable optical attenuator 111C of each wavelength at the transmitting end is adjusted to control pre-emphasis, so that uniformity of transmission characteristics of the optical signals of the respective wavelengths is achieved. Here, the control algorithm of the present invention is not limited to this.

Figure 13:
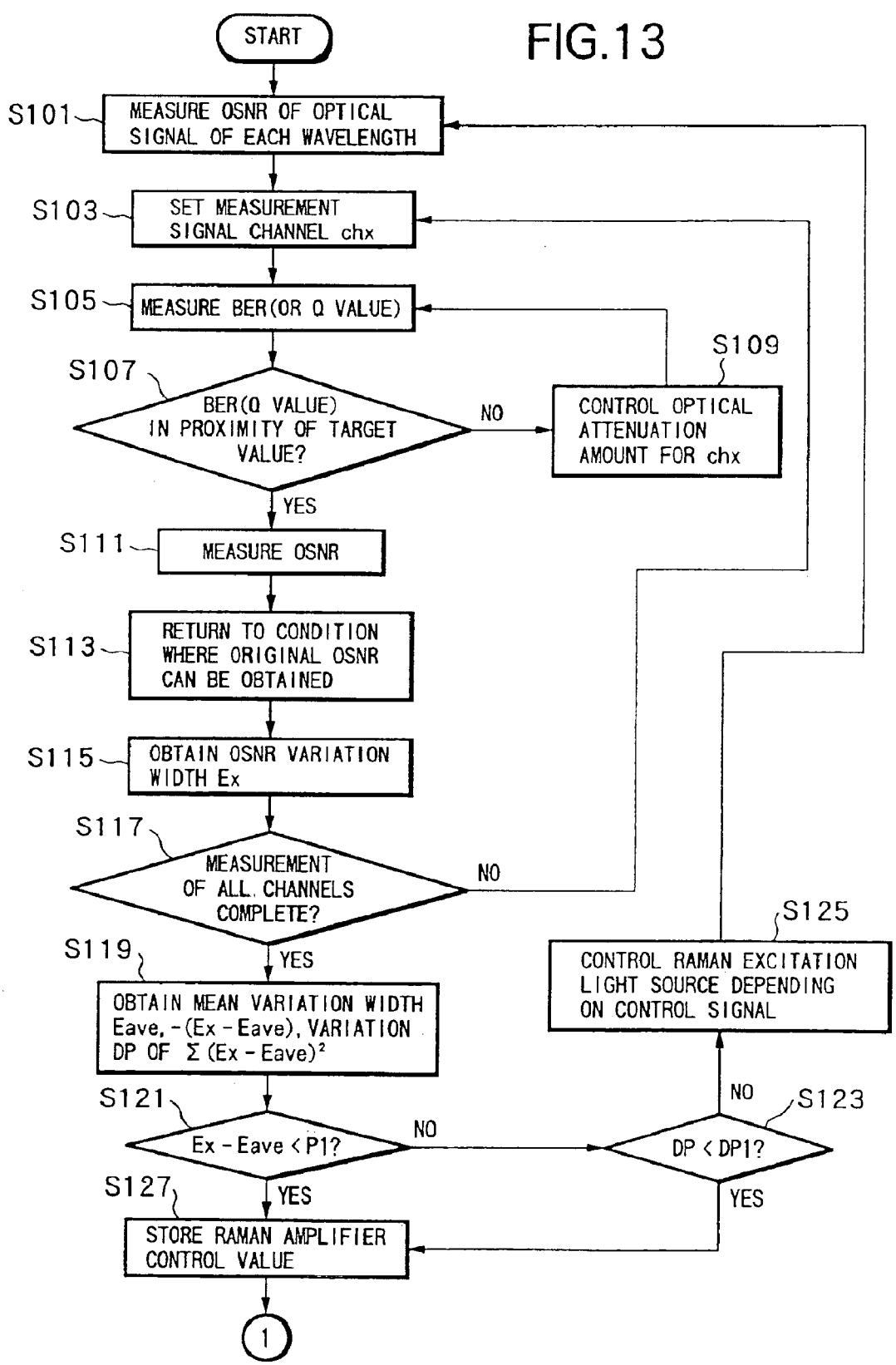
FIG. 13 is a first flow chart showing one example of a control algorithm in the third embodiment of the present invention.
Figure 14:
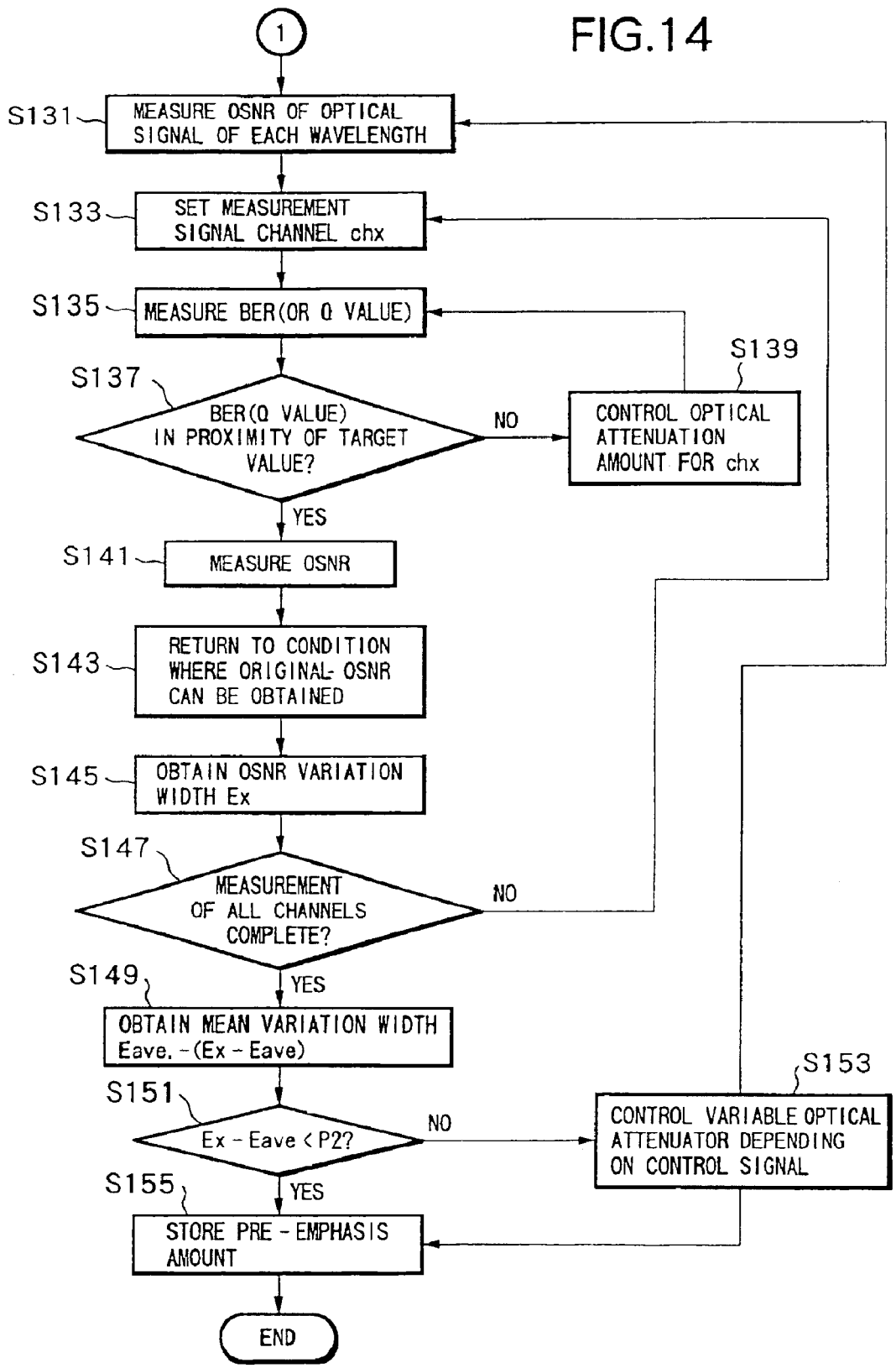
FIG. 14 is a second flow chart showing another example of the control algorithm in the third embodiment of the present invention.

FIG. 13 and FIG. 14 are flow charts showing the abovementioned control algorithm.

At first, in step 101 (denoted by S101 in the figure, and similarly for the following steps) of FIG. 13, with respect to the optical signals of the wavelengths $\lambda 1$~$\lambda n$, the OSNR at the receiving end is measured. Next, in step 103, one of the optical signals of wavelengths $\lambda 1$~$\lambda n$ is set to a measurement signal channel chx, and in step 105, the BER (or Q value) at the receiving end is measured. Then, in step 107, the BER (or Q value) measured in step 105 is judged as to whether it is in the proximity of a target value set in advance. In the case where the measured value is not in the proximity of the target value, in step 109 the variable optical attenuator 111C, corresponding to the measurement signal channel chx at the transmitting end, is adjusted, and control returns to step 105. On the other hand, in the case where the measured value is in the proximity of the target value, in step 111 the OSNR at the receiving end is measured. When the measurement in step 111 is completed, in step 113 the variable optical attenuator 111C is adjusted such that the OSN R value at the receiving end returns the same status as the value measured in step 101. Then, in step 115 a variation width Ex of the OSNR measured in step 111 with respect to the OSNR measured in step 101 is obtained. In step 117 it is judged whether or not the aforementioned variation width Ex has been obtained for all signal channels of the wavelengths $\lambda 1$~$\lambda n$. In the case where there is any signal channel for which the variation width Ex has not been obtained, control returns to step 103, and measurement is performed for any signal channel that has not been measured.

When the variation width Ex of the OSNR has been obtained for all wavelengths, in step 119 the mean value $E_{ave}$ of the variation width is obtained. Then, values of −(Ex−Eave) for the respective signal channels are obtained.

Furthermore, variation DP of $\Sigma(\text{Ex}-\text{Eave})^2$ due to the variation of the excitation light source output of each Raman amplifier is calculated based on the wavelength dependency of each $-(\text{Ex}-\text{Eave})$.

Next, in step 121 it is judged whether or not the absolute value of $-(\text{Ex}-\text{Eave})$ is less than a constant value P1. Furthermore, in step 123 it is judged whether or not the variation DP of $\Sigma(\text{Ex}-\text{Eave})^2$ is less than a constant value DP1. In the case where it is judged that the absolute value of $-(\text{Ex}-\text{Eave})$ is greater than or equal to the constant value P1, and the variation DP is greater than or equal to the constant value DP1, control proceeds to step 125 where the driving condition of the Raman excitation light source 131D of each optical repeater 130. Then, control returns to step 101, and the series of processing mentioned above is repeated. When it is judged either in step 121 or in step 123 that both values are less than their respective constant values, control proceeds to step 127 where the control condition of each Raman amplifier at that time is stored, control of Raman amplification is terminated, and control proceeds to pre-emphasis control.

Next, in step 131 through step 147 of FIG. 14, a series of processing similar to that in step 101 through step 117 mentioned above is performed. When the variation width Ex of the OSNR has been obtained for all wavelengths, in step 149 the mean value Eave of the variation width, and the value $-(\text{Ex}-\text{Eave})$ of each signal channel are obtained.

Next, in step 151 it is judged whether or not the absolute value of $-(\text{Ex}-\text{Eave})$ is less than a constant value P2. In the case where it is judged that the absolute value of $-(\text{Ex}-\text{Eave})$ is greater than or equal to the constant value P2, control proceeds to step 153, where a variation of pre-emphasis is computed based on the value of $-(\text{Ex}-\text{Eave})$, and pre-emphasis is controlled by adjusting the variable optical attenuator 111C at the transmitting end. Then control returns to step 131, and the series of processing mentioned above is repeated. When it is judged in step 151 that the absolute value of $-(\text{Ex}-\text{Eave})$ is less than the constant value P2, control proceeds to step 155, where the pre-emphasis amount at that time is stored, and the control algorithm sequence is completed.

According to the third embodiment mentioned above, pre-emphasis at the transmitting end and Raman amplification of each optical repeater are feedback controlled based on the reception information of the OSNR and BER measured at the receiving end, so that the transmission characteristics of the optical signals of respective wavelengths can be unified, and hence optimal transmission conditions can be obtained. Furthermore, the optical repeater 130 is constructed by a combination of the Raman amplifier 131 and the EDFA 132, and hence it is possible to achieve expansion of the optical signal waveband. Moreover, the condition of Raman amplification is controlled to compensate for changes of the gain-wavelength characteristics, and hence it is not necessary to install variable gain equalization filters on the optical transmission path L, or the number of gain equalization filters to be arranged can be reduced. Moreover, since it is possible to compensate for wavelength dependency of WDM signal light power not only at the transmitting end but also at each optical repeater 130, the pre-emphasis workload (requirement) performed at the transmitting end can be reduced.

Here, in the abovementioned third embodiment, the construction is such that in the optical receiving section of each terminal station, control information is generated for controlling pre-emphasis at the transmitting end and Raman amplification at each optical repeater based on the OSNR and BER (or Q value) measured, and the control information is transmitted to the transmitting end and each optical repeater using overhead information and supervisory control signals. However, the present invention is not limited to this. For example, the arrangement may be such that the OSNR and BER (or Q value) of each wavelength, measured at the receiving end, are transmitted to the transmitting end and to each optical repeater as reception information, and control information is generated at each device that receives the reception information to control pre-emphasis and Raman amplification.

Furthermore, the control information to be transmitted to each optical repeater 130 is transmitted from the optical transmitting section to each optical repeater 130 after it is first transmitted to the transmitting end through the opposing line. However, other than this, for example in the case of a repeater configuration where transmission of supervisory control signals is possible between the optical repeaters on the WE side and the optical repeaters on the EW side, the control information generated at the receiving end may be transmitted to each repeater using the opposing line without going via the transmitting end.

Moreover, in the third embodiment, the Raman amplifiers 131 of the optical repeaters 130 installed on the optical transmission path L are controlled depending on the reception information. However, with the present invention, the Raman amplification conditions of only some optical repeaters appropriately selected from among a plurality of optical repeaters may be controlled. For example, in the case where transmission loss changes due to an insertion or the like in the optical transmission path, one or more optical repeaters in the proximity of the repeater division where the insertion has been performed may be selected to perform Raman amplification control. In general, on the optical transmission path, the shorter the transmission distance over which gain wavelength characteristics are dispersed, the more nonlinear degradation and OSNR degradation are suppressed. Therefore, it is especially effective if the point where dispersion of gain wavelength characteristics occurs can be specified, as mentioned above. Of course, Raman amplifiers of a selected number out of several optical repeaters, either equally spaced or unequally spaced may be controlled. In this case, an optical repeater that is not provided with a Raman excitation light source control mechanism, and whose circuit construction is comparatively simple, can be used for the parts where Raman amplification control is not performed.

In addition, in the abovementioned third embodiment, the construction of the Raman amplifier 131 of the optical repeater 130 has been shown as the so-called backward excitation type wherein Raman excitation light is supplied in the opposite direction to the transmission direction of the signal light. However, the construction of the Raman amplifier used for the present invention is not limited to this.

Figure 15:
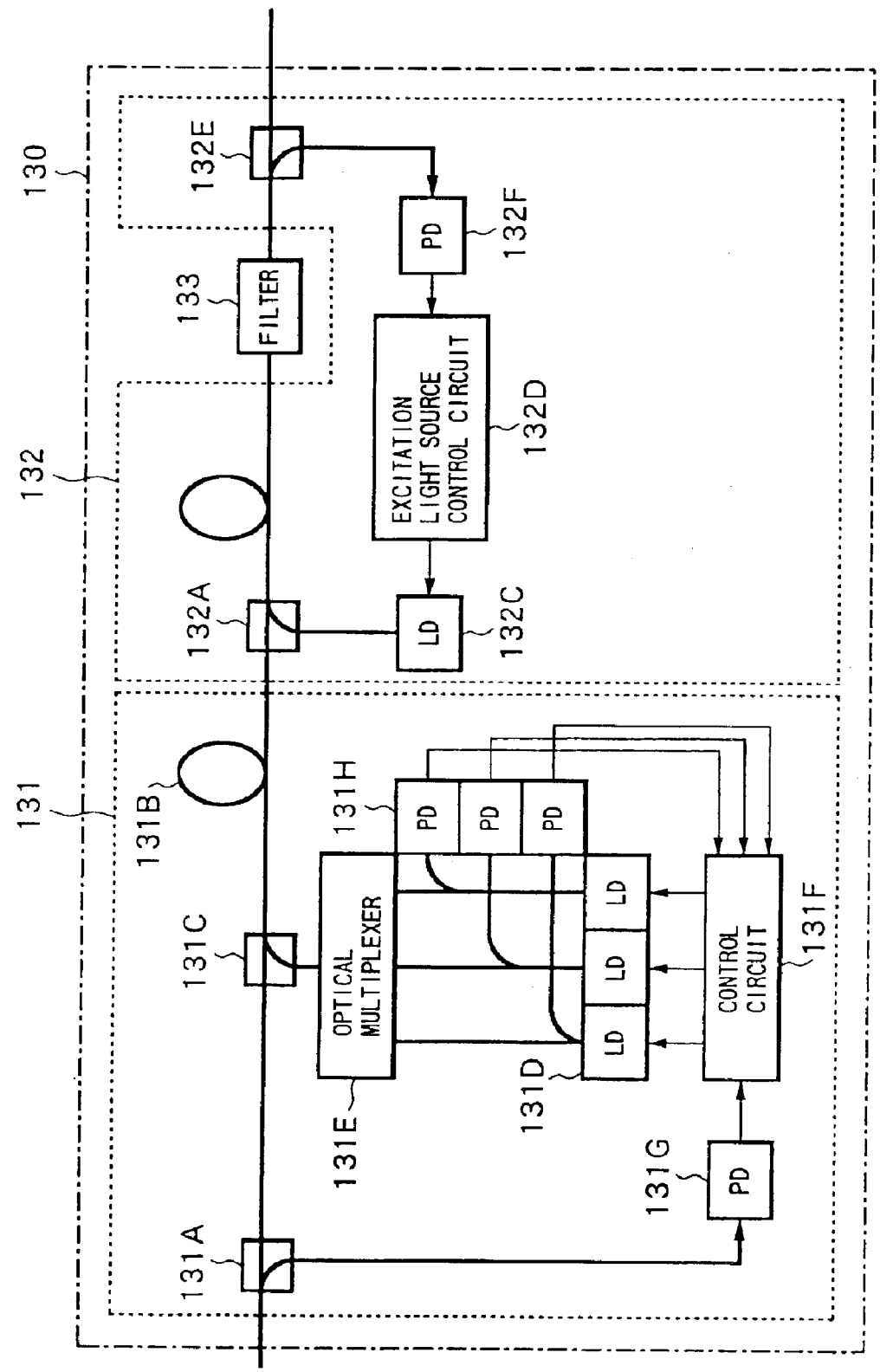
FIG. 15 shows another structural example of the optical repeater applicable to the third embodiment of the present invention.

For example, as shown in FIG. 15, it is possible to use a construction of the so-called forward excitation type, wherein Raman excitation light multiplexed by the optical coupler 131E is supplied from the signal light input side of the Raman amplification fiber 131B via the optical coupler 131C, and the signal light and the Raman excitation light are propagated in the same direction. In this case, a situation can be considered in which the Raman excitation light that passes through the Raman amplification fiber 131B is input to the EDFA 132 as leakage light. In such a situation, it is possible to utilize the leakage light as the excitation light of the EDFA 132.

Furthermore, the construction wherein the Raman amplification fiber 131B is positioned inside the Raman amplifier 131 has been shown. However, it is possible to use this Raman amplification fiber 131B as a part of the optical transmission path L. In other words, the arrangement may be such that with a part or the whole of the optical transmission path L as the Raman amplification medium, Raman excitation light is supplied to the optical transmission path L to generate Raman amplification. FIG. 16 is a structural example of an optical repeater in the case where the Raman amplification fiber 131B is used as the optical transmission path L.

Moreover, in the abovementioned third embodiment, the control information generated at the optical receiving end is superimposed on the overhead information and the supervisory control signal to be transmitted to the optical transmitting section and each optical repeater. However, the signal forwarding the control information in the present invention is not limited to this. For example, a dedicated optical signal for transmitting the control information may be used.

What is claimed:

1. A wavelength division multiplexing optical communication system for transmitting wavelength division multiplexed signal light containing a plurality of optical signals of different wavelengths, from a transmitting terminal station to a receiving terminal station via an optical transmission path, wherein said receiving terminal station comprises reception characteristics measurement means for measuring reception information including optical signal to noise ratio and a transmission error rate for the optical signals of respective wavelengths transmitted through said optical transmission path, and reception information transmission means for transmitting the reception information about each wavelength measured by said reception characteristics measurement means to said transmitting terminal station, and said transmitting terminal station comprises pre-emphasis performing means for performing pre-emphasis on the wavelength division multiplexed signal light transmitted along said optical transmission path, chirp applying means for applying an optical wavelength chirp to the wavelength division multiplexed signal light transmitted along said optical transmission path, and control means for controlling said pre-emphasis performing means and said chirp applying means, depending on the reception information about each wavelength transmitted from said receiving terminal station, wherein a setting of said pre-emphasis in said pre-emphasis performing means is made by said control means after said control means controls a setting of an a parameter representing an amount of the optical wavelength chirp in said chirp applying means, in a repeating sequence, so that said control means thereby controls said pre-emphasis performing means and said chirp applying means together to optimize transmission error rate or signal to noise ratio of the wavelength division multiplexed signal light at the receiving terminal station.

2. A wavelength division multiplexing optical communication system according to claim 1, wherein said optical transmission path has a first line for transmitting wavelength division multiplexed signal light from said transmitting terminal station to said receiving terminal station, and a second line opposite to said first line, and said reception information transmission means superimposes the reception information about each wavelength measured by said reception characteristics measuring means, onto overhead information of the optical signals corresponding to respective wavelength which is transmitted along said second line, and transmits this to said transmitting terminal station end.

3. A wavelength division multiplexing optical communication system according to claim 1, wherein said transmitting terminal station comprises: optical transmitting device for generating said optical signals of respective wavelength and outputting these, optical multiplexing device for multiplexing the optical signals of respective wavelengths output from said optical transmitting device and outputting to said optical transmission path, and reception information transfer means for transferring the reception information about each wavelength transmitted from said receiving terminal station between said optical signal transmitting device and said optical multiplexing device, and said pre-emphasis performing means and said chirp applying means are respectively provided in at least one of said optical signal transmitting device and said optical multiplexing device.

4. A wavelength division multiplexing optical communication system according to claim 3, wherein there is provided an optical amplifier disposed on said optical transmission path, and said transmitting terminal station has reception information transmitting means for transmitting the reception information about each wavelength transmitted from said receiving terminal station to said optical amplifier, and said optical amplifier has supervisory control means for controlling operating conditions in accordance with the reception information about each wavelength transmitted from said transmitting terminal station.

5. A wavelength division multiplexing optical communication system according to claim 3, wherein there is provided an optical add and drop multiplexer disposed on said optical transmission path, and said transmitting terminal station has reception information transmitting means for transmitting the reception information about each wavelength transmitted from said receiving terminal station to said optical add and drop multiplexer, and said optical add and drop multiplexer has supervisory control means for controlling operating conditions in accordance with the reception information about each wavelength transmitted from said transmitting terminal station.

6. A wavelength division multiplexing optical communication system according to claim 1, wherein said transmitting terminal station has wavelength dispersion compensating means for compensating for wavelength dispersion characteristics of said optical transmission path, and said control means also controls a wavelength dispersion compensation amount in said wavelength dispersion compensation means corresponding to the reception information about each wavelength transmitted from said receiving terminal station.

7. A wavelength division multiplexing optical communication system according to claim 1, wherein said receiving terminal station comprises: wavelength dispersion compensating means for compensating for wavelength dispersion characteristics of said optical transmission path, polarization-mode dispersion compensating means for compensating for polarization-mode dispersion generated in said optical transmission path, data discriminating means for performing data discrimination processing of received wavelength division multiplexed signal light, and control means for respectively controlling a wavelength dispersion compensation amount in said wavelength dispersion compensation means, a polarization-mode dispersion compensating amount in said polarization-mode dispersion compensating means and the setting of a discrimination decision point in said data discriminating means, depending on the reception information about each wavelength transmitted from said receiving terminal station.

8. A wavelength division multiplexing optical communication system according to claim 1, wherein said reception characteristics measurement means measures an electrical signal to noise ratio pertaining to the optical signals of respective wavelengths transmitted along said optical transmission path, and converts the measured electrical signal to noise ratio to an optical signal to noise ratio according to a previously set relationship between the electrical signal to noise ratio and the optical signal to noise ratio, to thereby obtain reception information about each wavelength.

9. A wavelength division multiplexing optical communication system according to claim 1, wherein said reception characteristics measurement means measures an electrical signal to noise ratio pertaining to the optical signals of respective wavelengths transmitted along said optical transmission path, and converts the measured electrical signal to noise ratio to a transmission error rate according to a previously set relationship between the electrical signal to noise ratio and the transmission error rate, to thereby obtain reception information about each wavelength.

10. A wavelength division multiplexing optical communication method for transmitting a wavelength division multiplexed optical signal, containing a plurality of optical signals of different wavelengths, from a transmitting terminal station to a receiving terminal station via an optical transmission path, wherein in said receiving terminal station, reception information including an optical signal to noise ratio and a transmission error rate for the optical signals of respective wavelengths transmitted through said optical transmission path is measured, and the measured reception information about each wavelength is transmitted to said transmitting terminal station, and in said transmitting terminal station, depending on the reception information about each wavelength transmitted from said receiving terminal station, the setting of pre-emphasis to be performed on the wavelength division multiplexed signal light transmitted along said optical transmission path and the setting a parameter a representing an amount of the optical wavelength chirp applied to the wavelength division multiplexed signal light transmitted along said optical transmission path are respectively controlled, wherein the setting of said pre-emphasis is made after controlling the setting of the a parameter representing an amount of the optical wavelength chirp, in a repeating sequence, so that the performed pre-emphasis and applied optical wavelength chirp are controlled together to optimize signal to noise ratio or transmission error rate of the wavelength division multiplexed optical signal at the receiving terminal station.

11. A wavelength division multiplexing communication system for transmitting wavelength division multiplexed signal light containing a plurality of optical signals of different wavelengths, from a transmitting terminal station to a receiving terminal station via an optical transmission path and an optical repeater station, wherein said receiving terminal station comprises reception characteristics measurement means for measuring reception information including an optical signal to noise ratio and a transmission error rate for the optical signals of respective wavelengths transmitted through said optical transmission path, and reception information transmission means for transmitting the reception information about each wavelength measured by said reception characteristics measurement means to said transmitting terminal station, said transmitting terminal station comprises pre-emphasis performing means for performing pre-emphasis on the wavelength division multiplexed signal light transmitted along said optical transmission path, control means for controlling, depending on the reception information about each wavelength transmitted from said receiving terminal station, the setting of pre-emphasis in said pre-emphasis performing means, and reception information transfer means for transferring the reception information about each wavelength transmitted from said receiving terminal station to said optical repeater station, said optical repeater station comprises optical amplification means containing a Raman amplifier for Raman amplifying the wavelength division multiplexed signal light transmitted from said optical transmission path, and Raman amplification control means for controlling a supply condition of Raman excitation light in said Raman amplifier corresponding to the reception information about each wavelength transmitted from said transmitting terminal station, and said control means of said transmitting terminal station and said Raman amplification control means of said optical repeater station control the setting of pre-emphasis in said pre-emphasis performing means after controlling the supply condition of Raman excitation light in said Raman amplifier.

12. A wavelength division multiplexing optical communication system according to claim 11, wherein said optical amplification means of said optical repeater station has an optical fiber amplifier for amplifying to a constant level using a rare earth element doped fiber, the wavelength division multiplexed signal light output from said Raman amplifier.

13. A wavelength division multiplexing optical communication system according to claim 11, wherein said optical transmission path has a first line for transmitting the wavelength division multiplexed signal light from said transmitting terminal station to said receiving terminal station, and a second line opposite to said first line, and said reception information transfer means of said receiving terminal station superimposes the reception information about each wavelength measured by said reception characteristic measuring means, onto overhead information of the optical signals corresponding to said wavelengths which is transmitted by said second line, and transmits this to said transmitting terminal station end, and said reception information transmission means of said transmitting terminal station superimposes and transfers said reception information about each wavelength, on a supervisory control signal superimposed onto the wavelength multiplexed signal light.

14. A wavelength division multiplexing optical communication system according to claim 11, wherein
said reception information transmission means of said receiving terminal station comprises a function for transmitting the reception information about each wavelength measured by said reception characteristics measuring means to said optical repeater station, instead of the reception information transfer means of said transmitting terminal station.

15. A wavelength division multiplexing optical communication system according to claim 11, wherein
when a plurality of optical repeater stations are arranged on said transmission path, the supply condition of Raman excitation light in said Raman amplifier by said Raman amplifier control means is controlled only for a specific optical repeater station selected from said plurality of optical repeater stations.

16. A wavelength division multiplexing optical communication method for transmitting a wavelength division multiplexed signal light containing a plurality of optical signals with different wavelengths, from a transmitting terminal station to a receiving terminal station via an optical transmission path and an optical repeater station, wherein
in said receiving terminal station, reception information including an optical signal to noise ratio and a transmission error rate for the optical signals of respective wavelengths transmitted through said optical transmission path is measured, and the measured reception information about each wavelength is transmitted to said transmitting terminal station,
in said transmitting terminal station, the reception information about each wavelength transmitted from said receiving terminal station is transferred to said optical repeater station,
in said optical repeater station, depending on the reception information about each wavelength transmitted from said transmitting terminal station, a supply condition of Raman excitation light for Raman amplifying the wavelength division multiplexed signal light transmitted through said optical transmission path is controlled, and
in said transmitting terminal station, depending on the reception information about each wavelength transmitted from said receiving terminal station, a setting of pre-emphasis to be performed on the wavelength division multiplexed signal light transmitted through said optical transmission path is controlled.

17. A wavelength division multiplexing optical communication system for transmitting a wavelength division multiplexed signal light containing a plurality of optical signals with different wavelengths, from a transmitting terminal station to a receiving terminal station via an optical transmission path and an optical repeater station, wherein
said receiving terminal station comprises reception characteristics measurement means for measuring reception information including an optical signal to noise ratio and a transmission error rate for the optical signals of respective wavelengths transmitted through said optical transmission path, and reception information transmission means for transmitting the reception information about each wavelength measured by said reception characteristics measurement means to said transmitting terminal station,
said transmitting terminal station comprises pre-emphasis performing means for performing pre-emphasis on the wavelength division, multiplexed signal light transmitted along said optical transmission path, chirp applying means for applying an optical wavelength chirp to the wavelength division multiplexed signal light transmitted along said optical transmission path, control means for controlling said pre-emphasis performing means and said chirp applying means, depending on the reception information about each wavelength transmitted from said receiving terminal station, wherein a setting of the pre-emphasis in said pre-emphasis performing means is after controlling a setting of an a parameter representing an amount of the optical wavelength chirp in said chirp applying means, and reception information transfer means for transferring the reception information about each wavelength transmitted from said receiving terminal station to said optical repeater station,
said optical repeater station comprises optical amplification means containing a Raman amplifier for Raman amplifying the wavelength division multiplexed signal light transmitted from said optical transmission path, and Raman amplification control means for controlling a supply condition of Raman excitation light in said Raman amplifier corresponding to the reception information about each wavelength transmitted from said transmitting terminal station, and
said control means of said transmitting terminal station and said Raman amplification control means of said optical repeater station control the setting of the a parameter representing the amount of the optical wavelength chirp in said chirp applying means, and the setting of pre-emphasis in said pre-emphasis performing means, after controlling the supply condition of Raman excitation light in said Raman amplifier so that the performed pre-emphasis, the applied chirp and the Raman amplification are controlled together, in a repeating sequence, to optimize signal to noise ratio or transmission error rate of the wavelength division multiplexed signal light at said receiving terminal station.

18. A wavelength division multiplexing optical communication system, comprising:
a transmitting terminal station having a pre-emphasis performing unit performing pre-emphasis on a wavelength division multiplexed signal light, containing a plurality of optical signals of different wavelength, transmitted along an optical transmission path, a chirp applying unit applying an optical wavelength chirp to the wavelength division multiplexed signal light transmitted along said optical transmission path, and a controller controlling a pre-emphasis setting in the pre-emphasis performing unit, and controlling an a parameter setting representing an amount of the optical wavelength chirp in said chirp applying unit depending on reception information about each wavelength;
a receiving terminal station having a reception characteristics measurer measuring reception information including optical signal to noise ratio (OSNR) and a transmission error rate of the optical signals of different wavelengths transmitted through said optical transmission path, and a reception information transmitter transmitting the reception information about each wavelength measured by said reception characteristics measurer to said transmitting terminal station,
wherein the pre-emphasis setting in said pre-emphasis performing unit is made after the a parameter setting, in a repeating sequence, so that the performed pre-emphasis and applied chirp are controlled together to optimize signal to noise ratio or transmission error rate of the wavelength division multiplexed signal light at the receiving terminal station.

19. The wavelength division multiplexing optical communication system according to claim 18, wherein
said optical transmission path has a first line for transmitting wavelength division multiplexed signal light from said transmitting terminal station to said receiving terminal station, and a second line opposite to said first line, and
said reception information transmitter superimposes the reception information about each wavelength measured by said reception characteristics measurer, onto overhead information of the optical signals corresponding to respective wavelength which is transmitted along said second line, and transmits the optical signals to said transmitting terminal station.

20. A wavelength division multiplexing optical communication method, comprising:
transmitting a wavelength division multiplexed signal light, containing a plurality of optical signals of different wavelengths, from a transmitting terminal station to a receiving terminal station via an optical transmission path;
measuring in said receiving terminal station, reception information including an optical signal to noise ratio and a transmission error rate of the optical signals of respective wavelengths transmitted through said optical transmission path, and transmitting the measured reception information about each wavelength to said transmitting terminal station, and
controlling in said transmitting terminal station, depending on the reception information about each wavelength transmitted from said receiving terminal station, a pre-emphasis setting to be performed on the wavelength division multiplexed signal light transmitted along said optical transmission path and controlling an a parameter setting representing an amount of the optical wavelength chirp applied to the wavelength division multiplexed signal light transmitted along said optical transmission path,
wherein the pre-emphasis setting is made after the a parameter setting representing the amount of the optical wavelength chirp, in a repeating sequence, so that the performed pre-emphasis and the applied chirp are controlled together to optimize signal to noise ratio or transmission error rate of the wavelength division multiplexed signal light at the receiving terminal station.

21. A method comprising:
transmitting a wavelength division multiplexed signal light from a transmitting terminal station to a receiving terminal station;
applying optical wavelength chirp the wavelength division multiplexed signal light by the transmitting terminal station; and
performing pre-emphasis on the wavelength division multiplexed signal light by the transmitting terminal station,
wherein the applied chirp and performed pre-emphasis are controlled together in accordance with an optical signal to noise ratio and transmission error rate of the wavelength division multiplexed signal light as measured at the receiving terminal station so that the pre-emphasis is performed after the chirp is applied in a repeating sequence to optimize signal to noise ratio or transmission error rate of the wavelength division multiplexed signal light at the receiving terminal station.

22. An apparatus comprising:
means for transmitting a wavelength division multiplexed signal light from a transmitting terminal station to a receiving terminal station;
means for applying optical wavelength chirp the wavelength division multiplexed signal light by the transmitting terminal station;
means for performing pre-emphasis on the wavelength division multiplexed signal light by the transmitting terminal station; and
means for controlling the applied chirp and performed pre-emphasis together in accordance with an optical signal to noise ratio and transmission error rate of the wavelength division multiplexed signal light as measured at the receiving terminal station so that the pre-emphasis is performed after the chirp is applied in a repeating sequence to optimize signal to noise ratio or transmission error rate of the wavelength division multiplexed signal light at the receiving terminal station.

23. A method comprising:
transmitting a wavelength division multiplexed signal light from a transmitting terminal station to a receiving terminal station;
performing Raman amplification of the wavelength division multiplexed signal light;
performing pre-emphasis on the wavelength division multiplexed signal light by the transmitting terminal station; and
applying chirp to the wavelength division multiplexed signal light by the transmitting terminal station,
wherein the performed Raman amplification, the performed pre-emphasis and the applied chirp are controlled together in accordance with an optical signal to noise ratio and transmission error rate of the wavelength division multiplexed signal light as measured at the receiving terminal station so that the applied chirp is controlled after the performed Raman amplification is controlled, and the performed pre-emphasis is controlled after the applied chirp is controlled, in a repeating sequence, to optimize signal to noise ratio or transmission error rate of the wavelength division multiplexed signal light at the receiving terminal station.

24. An apparatus comprising:
means for transmitting a wavelength division multiplexed signal light from a transmitting terminal station to a receiving terminal station;
means for performing Raman amplification of the wavelength division multiplexed signal light;
means for performing pre-emphasis on the wavelength division multiplexed signal light by the transmitting terminal station;
means for applying chirp to the wavelength division multiplexed signal light by the transmitting terminal station; and
means for controlling the performed Raman amplification, the performed pre-emphasis and the applied chirp together in accordance with an optical signal to noise ratio and transmission error rate of the wavelength division multiplexed signal light as mea sured at the receiving terminal station so that the applied chirp is controlled after the performed Raman amplification is controlled, and the performed pre-emphasis is controlled after the applied chirp is controlled, in a repeating sequence, to optimize signal to noise ratio or transmission error rate of the wavelength division multiplexed signal light at the receiving terminal station.

* * * * *

UNITED STATES PATENT AND TRADEMARK OFFICE
CERTIFICATE OF CORRECTION

PATENT NO. : 6,934,479 B2  Page 1 of 1
APPLICATION NO. : 09/776630
DATED : August 23, 2005
INVENTOR(S) : Takeshi Sakamoto et al.

It is certified that error appears in the above-identified patent and that said Letters Patent is hereby corrected as shown below:

On the cover page, item (56) References Cited, Other Publications, column 2, line 1, delete "(" before ""Optimization"

Column 25, line 50, after "of", delete "an"

Column 27, line 51, after "setting" insert --of--

Column 27, line 51, delete "a" second occurrence

Column 27, line 57, delete "a" before "parameter"

Column 29, line 66, after "division" delete ","

Column 30, line 10, after "of" delete "an"

Column 30, line 28, after "the" delete "a"

Column 30, line 50, after "controlling" delete "an"

Column 30, line 64, after "the" delete "a"

Column 31, line 37, after "controlling" delete "an"

Column 31, line 42, after "the" delete "a"

Signed and Sealed this

Twenty-ninth Day of August, 2006

JON W. DUDAS
*Director of the United States Patent and Trademark Office*